(12) United States Patent
Shibata et al.

(10) Patent No.: US 8,246,507 B2
(45) Date of Patent: Aug. 21, 2012

(54) CONTROL APPARATUS FOR VEHICLE DRIVE SYSTEM

(75) Inventors: Hiroyuki Shibata, Susono (JP); Tooru Matsubara, Toyota (JP); Atsushi Tabata, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 683 days.

(21) Appl. No.: 12/311,466

(22) PCT Filed: Nov. 6, 2007

(86) PCT No.: PCT/JP2007/071527
§ 371 (c)(1),
(2), (4) Date: Mar. 31, 2009

(87) PCT Pub. No.: WO2008/059729
PCT Pub. Date: May 22, 2008

(65) Prior Publication Data
US 2010/0069196 A1    Mar. 18, 2010

(30) Foreign Application Priority Data
Nov. 15, 2006   (JP) ................................. 2006-309505

(51) Int. Cl.
*B60K 1/02* (2006.01)
(52) U.S. Cl. ...................... 477/3; 180/65.275; 180/65.28
(58) Field of Classification Search ............... 180/65.21, 180/65.275, 65.28; 477/3, 107, 108, 111
See application file for complete search history.

(56) References Cited

U.S. PATENT DOCUMENTS

| 7,189,177 B2 | 3/2007 | Takasu et al. | |
|---|---|---|---|
| 2005/0070397 A1* | 3/2005 | Takasu et al. | 475/254 |

FOREIGN PATENT DOCUMENTS

| JP | A-2003-199212 | | 7/2003 |
|---|---|---|---|
| JP | A-2005-105957 | | 4/2005 |
| JP | A-2005-313865 | | 11/2005 |
| JP | A-2005-318780 | | 11/2005 |
| JP | 2006046487 A | * | 2/2006 |
| JP | A-2006-046487 | | 2/2006 |
| JP | A-2006-118667 | | 5/2006 |

* cited by examiner

*Primary Examiner* — Hau Phan
*Assistant Examiner* — Bryan Evans
(74) *Attorney, Agent, or Firm* — Oliff & Berridge, PLC

(57) ABSTRACT

A control apparatus for a vehicular drive system, including an engine speed limiting device configured to limit operating speed of engine to an upper limit determined according to speed ratio of automatic transmission portion, so as to prevent a rise of operating speed of first electric motor into excessive rise range, so that the excessive rise of the first electric motor speed due to a shifting action of the automatic transmission portion is prevented to improve the durability of the first electric motor. For example, the speed of the engine is limited to the upper limit when the automatic transmission portion is shifted to a failure gear position established as a result of a failure of the automatic transmission portion to perform a shifting action following a shifting boundary line map, so that the vehicle can be driven upon the failure of the automatic transmission portion, while preventing an excessive rise of the first electric motor speed.

8 Claims, 12 Drawing Sheets

|  | C1 | C2 | B1 | B2 | B3 | SPEED RATIO | STEPPING RATIO |
|---|---|---|---|---|---|---|---|
| 1st | ○ |  |  |  | ○ | 3.357 | 1.54 |
| 2nd | ○ |  |  | ○ |  | 2.180 | 1.53 |
| 3rd | ○ |  | ○ |  |  | 1.424 | 1.42 |
| 4th | ○ | ○ |  |  |  | 1.000 | SPREAD 3.36 |
| R |  | ○ |  |  | ○ | 3.209 |  |
| N |  |  |  |  |  |  |  |

○ ENGAGED

CONTROL APPARATUS FOR VEHICLE DRIVE SYSTEM

TECHNICAL FIELD

The present invention relates to a control apparatus for a vehicular drive system including an electric differential portion (or a continuously-variable transmission portion) having a differential mechanism operable to perform a differential function, and a transmission portion provided in a power transmitting path between the differential portion and a drive wheel, and more particularly to techniques for improving durability of an electric motor and the differential mechanism of the differential portion.

BACKGROUND ART

There is well known a control apparatus for a vehicular drive system including a differential portion having a first element connected to an engine, a second element connected to a first electric motor and a third element connected to a power transmitting member and operable to distribute an output of the engine to the first electric motor and the power transmitting member, and a transmission portion provided in a power transmitting path between the differential portion and a drive wheel.

Patent Document 1 discloses an example of a control apparatus for such a vehicular drive system wherein the differential mechanism is constituted by a planetary gear set, and the differential portion includes a second electric motor operatively connected to the power transmitting member, while the transmission portion is constituted by a step-variable automatic transmission. The drive system has an overall speed ration defined by a gear ratio of the differential portion functioning as a continuously-variable transmission, and a gear (speed ratio) of each gear position (speed position) of the transmission portion.

Patent Document 1: JP-2006-118667 A
Patent Document 2; JP-2003-199212 A
Patent Document 3: JP-2005-313865 A
Patent Document 4: JP-2005-318780 A

DISCLOSURE OF THE INVENTION

Object Achieved by the Invention

It is noted that the rotating speed of the power transmitting member which is an output member of the differential portion is an input speed of the transmission portion and is determined by an output speed of the transmission portion. For instance, the rotating speed of the power transmitting member is determined by a running speed of a vehicle and the gear ratio of the transmission portion.

Therefore, the rotating speed of the power transmitting member (third element) changes according to a shifting action of the transmission portion, and the operating speed of the first electric motor (first element) determined by a relationship among relative rotating speeds of the first, second and third elements may be excessively high, giving rise to a possibility of deterioration of durability of the first electric motor, depending upon the gear ratio of the transmission portion established by the shifting action, or a possibility of deterioration of durability of a pinion gear (e.g., pinion needle bearing) of the differential mechanism due to a rise of the rotating speed of the pinion gear that is determined by a difference between the operating speed of the engine (first element) and the rotating speed of the power transmitting member (third element), depending upon the gear ratio of the transmission portion and the vehicle speed The present invention was made in view of the background art described above. It is therefore an object of this invention to provide a control apparatus for a vehicular drive system, which control apparatus ensures an improvement of the durability of the first electric motor or the pinion gear, by preventing an excessive rise of the operating speed of the first electric motor or the rotating speed of the pinion gear.

Means for Achieving the Object

The object indicated above can be achieved according to a first form of this invention, which provides a control apparatus for (a) a drive system of a vehicle including a differential portion having a differential mechanism having a first element connected to an engine, a second element connected to a first electric motor and a third element connected to a power transmitting member and configured to distribute an output of the engine to the first electric motor and said power transmitting member, and a transmission portion disposed in a power transmitting path between the power transmitting member and a drive wheel, the control apparatus being characterized by comprising (b) engine speed limiting means for limiting a speed range of the engine according to a speed ratio of the transmission portion.

Advantages of the Invention

According to the control apparatus described above, the speed range of the engine is limited according to the speed ratio of the transmission portion, by the engine speed limiting means, so that an excessive rise of the speed of the first electric motor or a pinion gear of the differential mechanism due to a shifting action of the transmission portion is prevented to improve the durability of the first electric motor or pinion gear.

In a second form of the invention according to the first form, the engine speed limiting means limits the operating speed of the engine to within a range not higher than an upper limit. In this form of the invention, the excessive rise of the speed of the first electric motor due to a shifting action of the transmission portion is prevented to improve the durability of the first electric motor.

In a third form of the invention according to the first form, the engine speed limiting means limits the operating speed of the engine to within a range not lower than a lower limit. In this form of the invention, an excessive rise of a pinion gear of the differential mechanism due to a shifting action of the transmission portion is prevented to improve the durability of the pinion gear.

In a fourth form of the invention according to any one of the first through third forms, the engine speed limiting means limits the range of the operating speed of the engine by limiting a load of the engine. In this form of the invention, the operating speed of the engine can be adequately limited so as to prevent an excessive rise of the speed of the first electric motor or a pinion gear of the differential mechanism, for example.

In a fifth form of the invention according to any one of the first through fifth forms, the engine speed limiting means limits the range of the operating speed of the engine on the basis of a running speed of a vehicle. In this form of the invention, the operating speed of the engine can be adequately limited according to a running speed of the vehicle, so as to prevent an excessive rise of the speed of the first electric motor or a pinion gear of the differential mechanism, for example.

In a sixth form of the invention according to any one of the first through fifth forms, the transmission portion is constituted by an automatic transmission configured to be shifted according to a predetermined shifting map, and the engine speed limiting means limits the range of the operating speed of the engine, when the automatic transmission is shifted as a result of a failure to perform shifting actions according to the shifting map. In this form of the invention, the vehicle can be driven even in the event of the failure of the automatic transmission, while preventing an excessive rise of the speed of the first electric motor or the pinion ear of the differential mechanism.

In a seventh form of the invention according to any one of the first through sixth forms, the differential portion is operable as a continuously-variable transmission by controlling an operating state of the first electric motor. In this form of the invention, the differential portion and the transmission portion cooperate to constitute a continuously-variable transmission capable of smoothly changing the vehicle drive torque. It is noted that the differential portion is operable as a step-variable transmission the speed ratio of which is variable in steps, as well as the electrically controlled continuously-variable transmission the speed ratio of which is continuously variable.

Preferably, the differential mechanism is a planetary gear set having a first element connected to the engine, a second element connected to the first electric motor and a third element connected to the power transmitting member. The first, second and third elements are respectively a carrier, a sun gear and a ring ear of the planetary gear set. In this case, the axial dimension of the differential mechanism can be reduced, and the differential mechanism constituted by the single planetary gear set can be made simple in construction.

Preferably, the above-described planetary gear set is of a single-pinion type. In this case, the axial dimension of the differential mechanism can be reduced, and the differential mechanism constituted by the single planetary gear set of the single-pinion type can be made simple in construction.

Preferably, the drive system has an overall speed ration defined by a speed ratio of the transmission portion and a speed ratio of the differential portion. In this case, the vehicle drive force can be changed over a wide range by utilizing the speed ratio of the transmission portion.

Preferably, the transmission portion is a step-variable automatic transmission. In this case, a continuously-variable transmission is constituted by the differential portion functioning as an electric continuously-variable transmission and the step-variable automatic transmission, and is capable of smoothly changing the vehicle drive torque. When the speed ratio of the differential portion is controlled to be held constant, the differential portion and the step-variable automatic transmission cooperate to function as a step-variable transmission, and the overall speed ratio of the drive system is variable in steps, permitting a rapid change of the vehicle drive torque.

Preferably, the engine load is represented by a required load acting on the engine, which is selected for example from among: an operation amount (angle of opening) of an accelerator pedal; an angle of opening of a throttle valve, an intake air quantity or a fuel injection amount, which corresponds to the angle of opening of the accelerator pedal; and an intake air quantity or a fuel injection amount determined by a target angle of opening of the throttle valve.

BRIEF DESCRIPTION OF THE INVENTION

Figure 4:
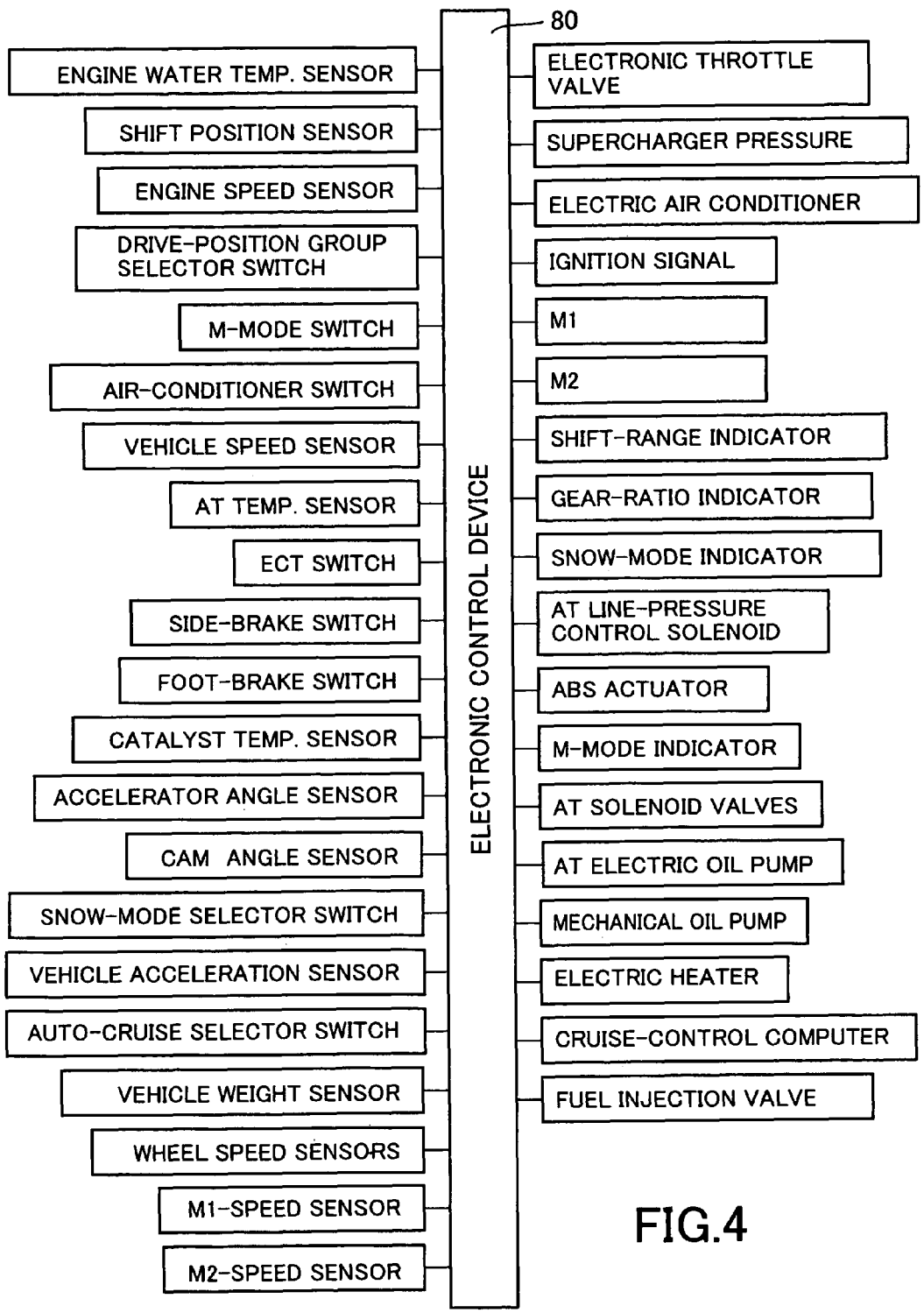
FIG. 4 is a view indicating input and output signals of an electronic control device provided for the drive system of FIG. 1.
Figure 12:
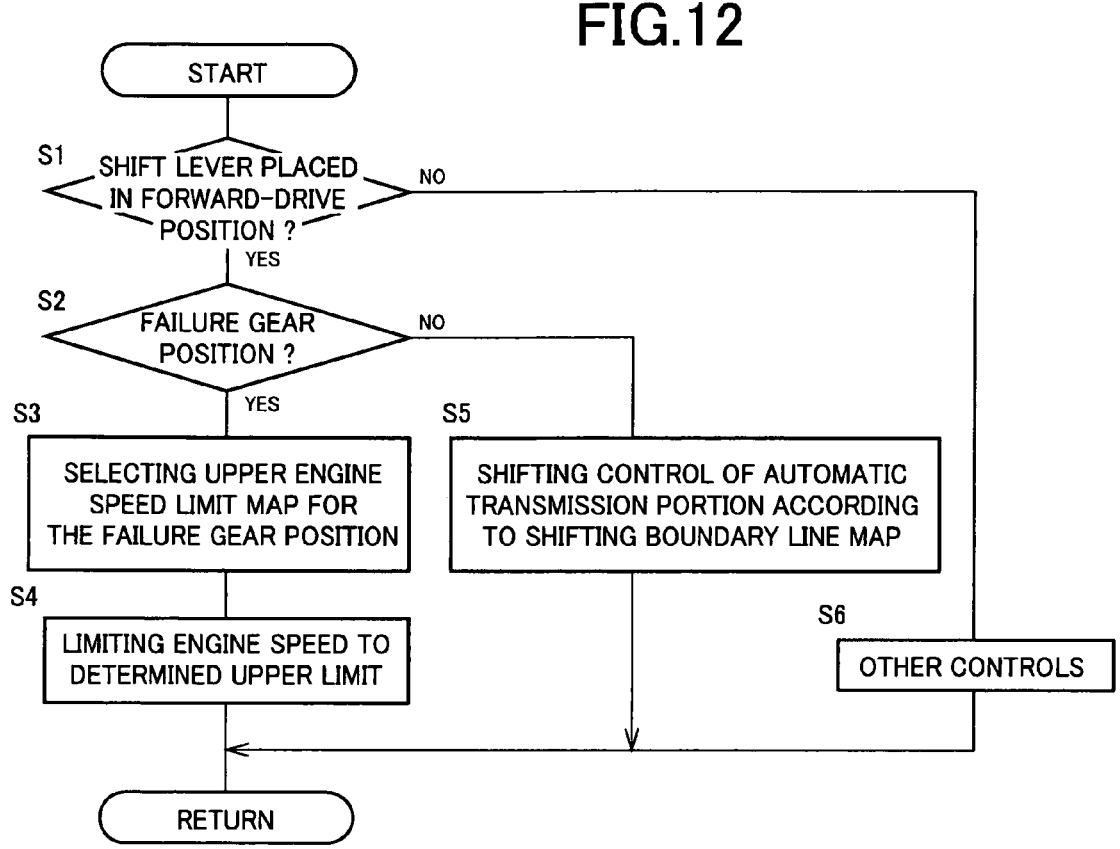
FIG. 12 is a flow chart illustrating a control operation performed by the electronic control device of FIG. 4 to improve the durability of a first electric motor by preventing an excessive rise of the operating speed of the first electric motor due to a shifting action of an automatic transmission portion.
Figure 13:
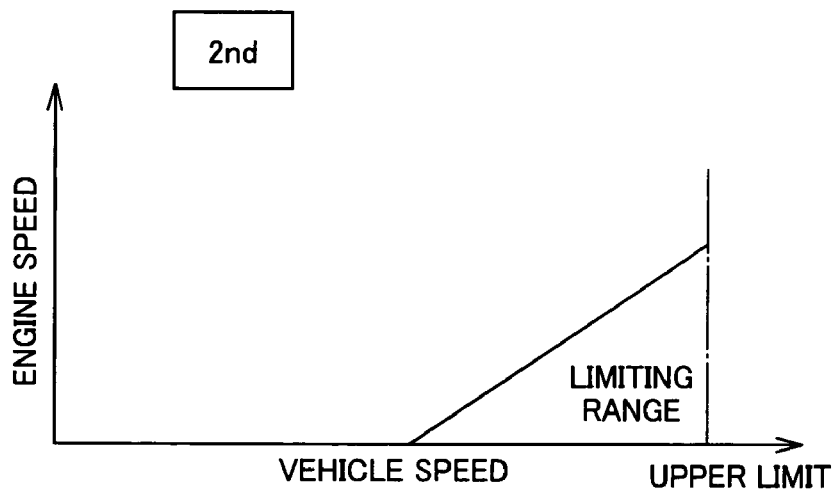
Figure 13:
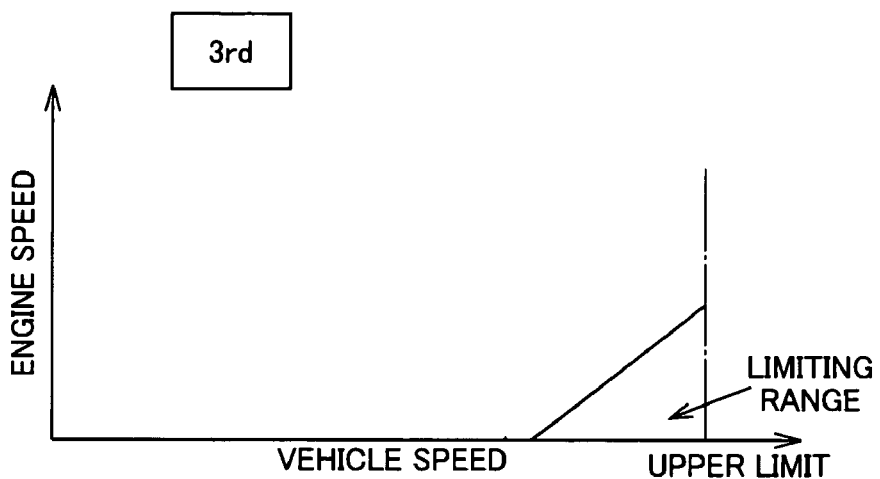
Figure 13:
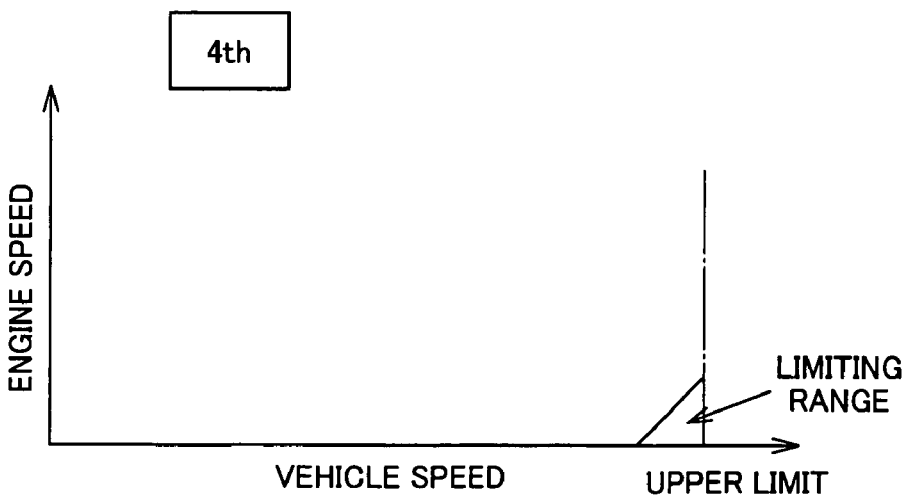
Figure 14:
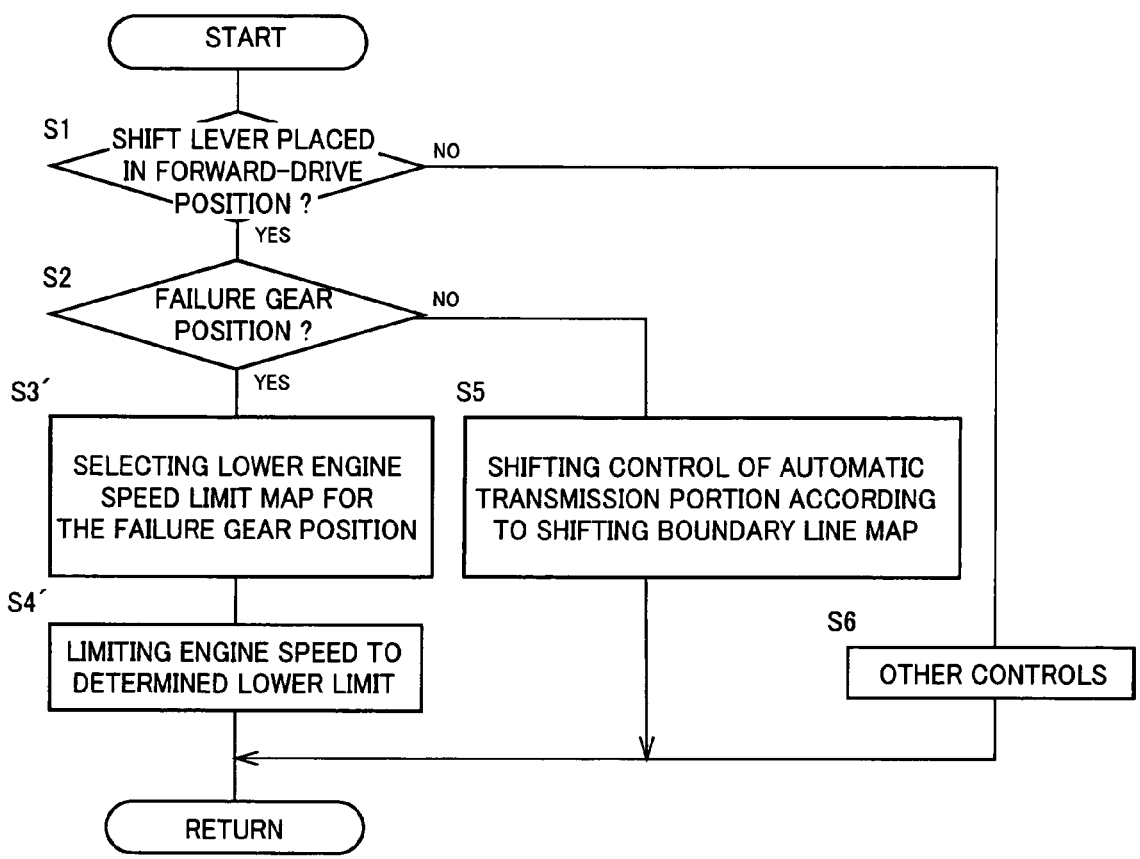

FIG. 13 is a view indicating examples of a lower engine speed limit map used for the engine speed limiting control for the respective failure gear positions; and FIG. 14 is a flow chart corresponding to that of FIG. 12, illustrating a control operation performed by the electronic control device of FIG. 4 according to another embodiment of the invention, to improve the durability of a first planetary gear set by preventing an excessive rise of the operating speed of the first planetary gear set due to the shifting action of the automatic transmission portion;

NOMENCLATURE OF ELEMENTS

8: Engine
10: Transmission mechanism (Vehicular drive system)
11: Differential portion
16: Power distributing mechanism (Differential mechanism)
18: Power transmitting member
20: Automatic transmission portion (Transmission portion, Automatic transmission)
34: Drive wheels 80: Electric control device (Control apparatus)
86: Engine speed limiting means
M1: First electric motor

BEST MODE FOR CARRYING OUT THE INVENTION

The preferred embodiments of this invention will be described in detail by reference to the drawings.

First Embodiment

Figures 1, 2:
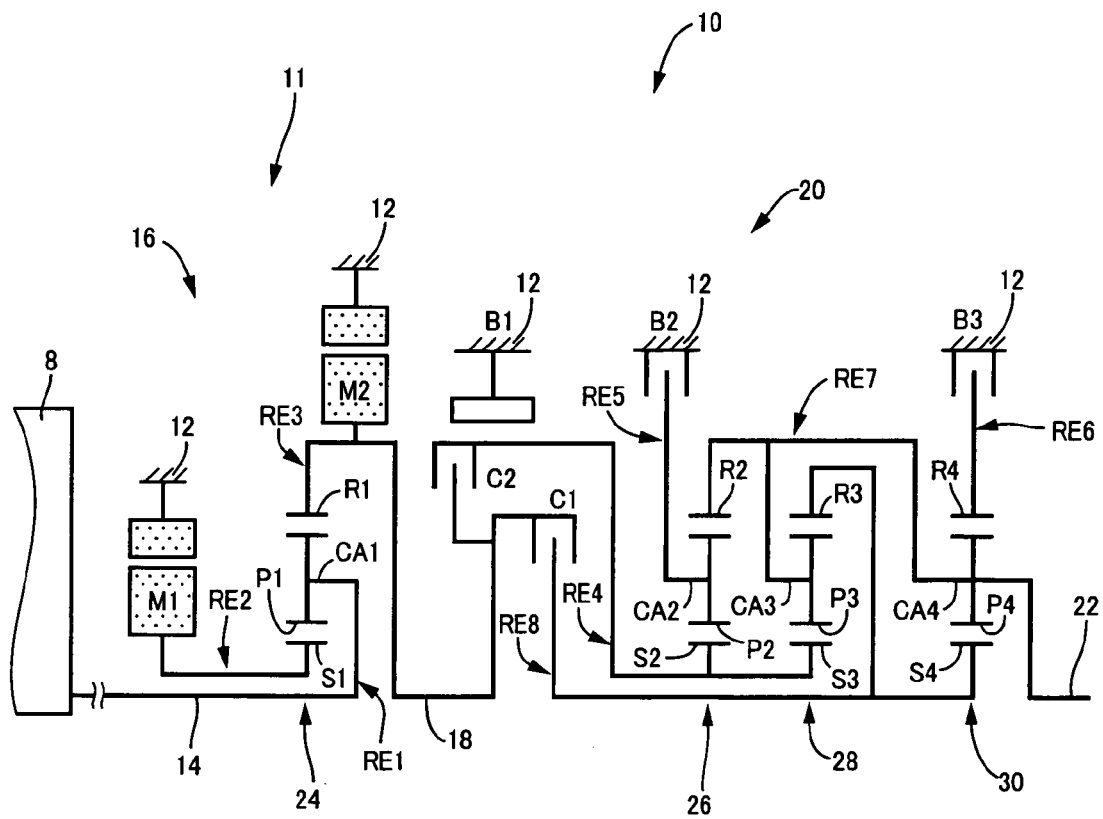
FIG. 1 is a schematic view showing an arrangement of a drive system of a hybrid vehicle according to one embodiment of this invention.
FIG. 2 is a table indicating combinations of operating states of hydraulically operated frictional coupling devices used to perform shifting actions of the drive system of FIG. 1.
Figure 7:
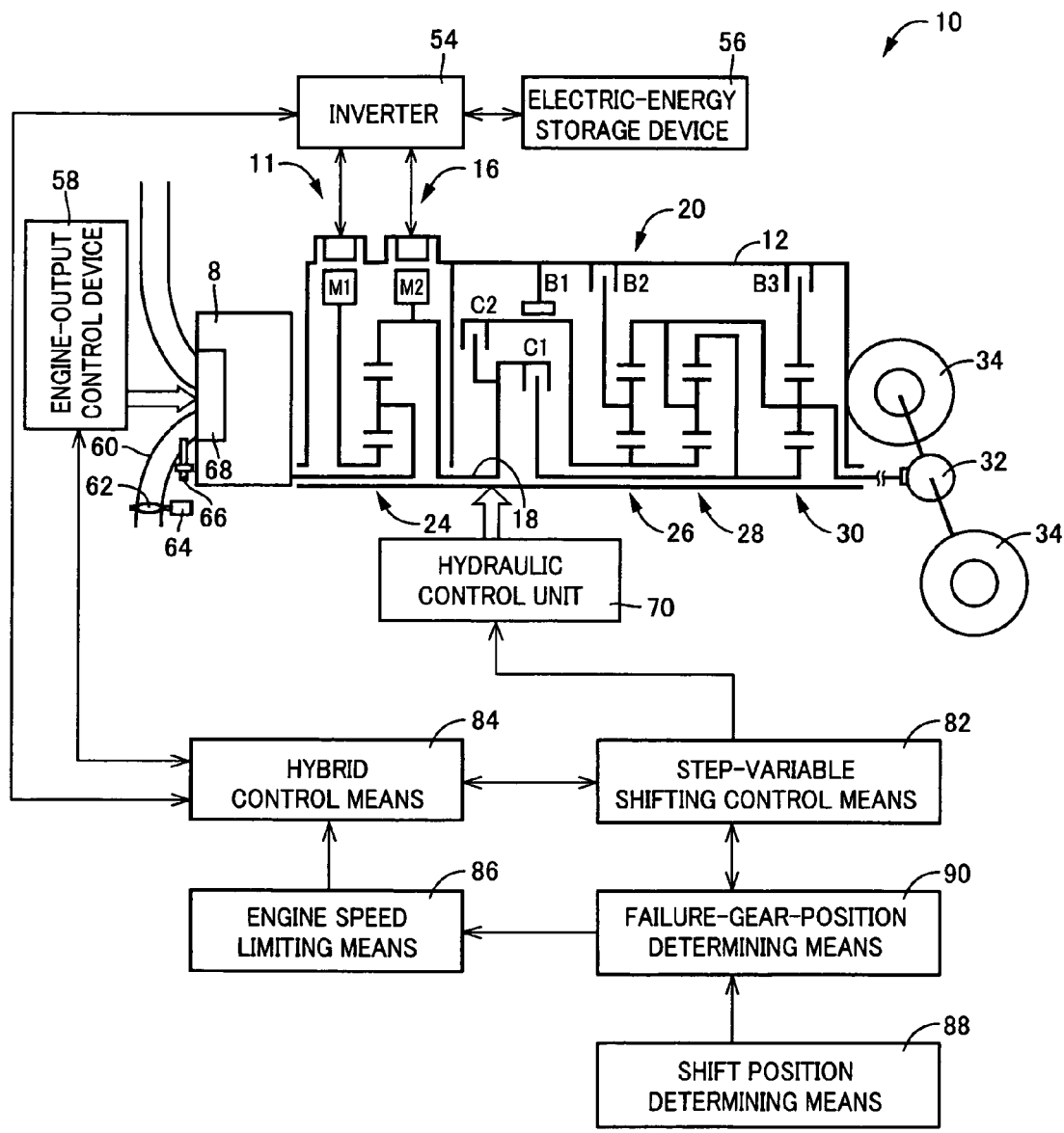
FIG. 7 is a functional block diagram illustrating major control functions of the electronic control device of FIG. 4.

Referring to the schematic view of FIG. 1, there is shown a transmission mechanism 10 constituting a part of a drive system for a hybrid vehicle, to which the present invention is applicable. As shown in FIG. 1, the transmission mechanism 10 includes: an input rotary member in the form of an input shaft 14; a continuously-variable transmission portion in the form of a differential portion 11 connected to the input shaft 14 either directly, or indirectly via a pulsation absorbing damper (vibration damping device) not shown; a power transmitting portion in the form of an automatic transmission portion 20 disposed in a power transmitting path between the differential portion 11 and drive wheels 34 (shown in FIG. 7) of the vehicle, and connected in series via a power transmitting member 18 (power transmitting shaft) to the differential portion 11 and the drive wheels 34; and an output rotary member in the form of an output shaft 22 connected to the automatic transmission portion 20. The input shaft 14, differential portion 11, automatic transmission portion 20 and output shaft 22 are coaxially disposed on a common axis in a transmission casing 12 (hereinafter referred to simply as "casing 12") functioning as a stationary member attached to a body of the vehicle, and are connected in series with each other. This transmission mechanism 10 is suitably used for a longitudinal FR vehicle (front-engine, rear-drive vehicle), and is disposed between a drive power source in the form of an engine 8 and the pair of drive wheels 34, to transmit a vehicle drive force from the engine 8 to the pair of drive wheels 34 through a differential gear device 32 (final speed reduction gear) and a pair of drive axles, as shown in FIG. 7. The engine 8 may be a gasoline engine or diesel engine and functions as a vehicle drive power source directly connected to the input shaft 14 or indirectly via a pulsation absorbing damper.

In the present transmission mechanism 10, the engine 8 and the differential portion 11 are directly connected to each other. This direct connection means that the engine 8 and the transmission portion 11 are connected to each other, without a fluid-operated power transmitting device such as a torque converter or a fluid coupling being disposed therebetween, but may be connected to each other through the pulsation absorbing damper as described above. It is noted that a lower half of the transmission mechanism 10, which is constructed symmetrically with respect to its axis, is omitted in FIG. 1. This is also true to the other embodiment of the invention described below.

The differential portion 11 is provided with: a first electric motor M1; a power distributing mechanism 16 functioning as a differential mechanism operable to mechanically distribute an output of the engine 8 received by the input shaft 14, to the first electric motor M1 and the power transmitting member 18; and a second electric motor M2 which is operatively connected to and rotated with the power transmitting member 18. Each of the first and second electric motors M1 and M2 used in the present embodiment is a so-called motor/generator having a function of an electric motor and a function of an electric generator. However, the first electric motor M1 should function at least as an electric generator operable to generate a reaction force, while the second electric motor M2 should function at least as an electric motor operable to produce a vehicle drive force.

The power distributing mechanism 16 includes, as a major component, a first planetary gear set 24 of a single pinion type having a gear ratio $\rho 1$ of about 0.418, for example. The first planetary gear set 24 has rotary elements consisting of: a first sun gear S1, a first planetary gear P1; a first carrier CA1 supporting the first planetary gear P1 such that the first planetary gear P1 is rotatable about its axis and about the axis of the first sun gear S1; and a first ring gear R1 meshing with the first sun gear S1 through the first planetary gear P1. Where the numbers of teeth of the first sun gear S1 and the first ring gear R1 are represented by ZS1 and ZR1, respectively, the above-indicated gear ratio $\rho 1$ is represented by ZS1/ZR1.

In the power distributing mechanism 16, the first carrier CA1 is connected to the input shaft 14, that is, to the engine 8, and the first sun gear S1 is connected to the first electric motor M1, while the first ring gear R1 is connected to the power transmitting member 18. The power distributing mechanism 16 is operated in a differential state in which three elements of the first planetary gear set 24 consisting of the first sun gear S1, first carrier CA1 and first ring gear R1 are rotatable relative to each other, so as to perform a differential function. In the differential state, the output of the engine 8 is distributed to the first electric motor M1 and the power transmitting member 18, whereby a portion of the output of the engine 8 is used to drive the first electric motor M1 to generate an electric energy which is stored or used to drive the second electric motor M2. Thus, the differential portion 11 (power distributing mechanism 16) functions as an electric differential device, which is operable in a continuously-variable shifting state (electric CVT state) in which the rotating speed of the power transmitting member 18 is continuously variable, irrespective of the operating speed of the engine 8, namely, the differential portion 11 functions as a continuously variable transmission a speed ratio $\gamma 0$ (rotating speed $N_{IN}$ of the input shaft 14/rotating speed $N_{18}$ of the power transmitting member 18) of which is continuously changed from a minimum value $\gamma 0min$ to a maximum value $\gamma 0max$.

The automatic transmission portion 20 includes a single-pinion type second planetary gear set 26, a single-pinion type third planetary gear set 28 and a single-pinion type fourth planetary gear set 30. The automatic transmission portion 20 is a multiple-step transmission of a planetary gear type operable as a step-variable automatic transmission. The second planetary gear set 26 has: a second sun gear S2; a second planetary gear P2; a second carrier CA2 supporting the second planetary gear P2 such that the second planetary gear P2 is rotatable about its axis and about the axis of the second sun gear S2; and a second ring gear R2 meshing with the second sun gear S2 through the second planetary gear P2. For example, the second planetary gear set 26 has a gear ratio $\rho 2$ of about 0.562. The third planetary gear set 28 has: a third sun gear S3; a third planetary gear P3; a third carrier CA3 supporting the third planetary gear P3 such that the third planetary gear P3 is rotatable about its axis and about the axis of the third sun gear S3; and a third ring gear R3 meshing with the third sun gear S3 through the third planetary gear P3. For example, the third planetary gear set 28 has a gear ratio $\rho 3$ of about 0.425. The fourth planetary gear set 30 has: a fourth sun gear S4; a fourth planetary gear P4; a fourth carrier CA4 supporting the fourth planetary gear P4 such that the fourth planetary gear P4 is rotatable about its axis and about the axis of the fourth sun gear S4; and a fourth ring gear R4 meshing with the fourth sun gear S4 through the fourth planetary gear P4. For example, the fourth planetary gear set 30 has a gear ratio ρ4 of about 0.421. Where the numbers of teeth of the second sun gear S2, second ring gear R2, third sun gear S3, third ring gear R3, fourth sun gear S4 and fourth ring gear R4 are represented by ZS2, ZR2, ZS3, ZR3, ZS4 and ZR4, respectively, the above-indicated gear ratios ρ2, ρ3 and ρ4 are represented by ZS2/ZR2. ZS3/ZR3, and ZS4/ZR4, respectively.

In the automatic transmission portion 20, the second sun gear S2 and the third sun gear S3 are integrally fixed to each other as a unit, selectively connected to the power transmitting member 18 through a second clutch C2, and selectively fixed to the casing 12 through a first brake B1. The second carrier CA2 is selectively fixed to the casing 12 through a second brake B2, and the fourth ring gear R4 is selectively fixed to the casing 12 through a third brake B3. The second ring gear R2, third carrier CA3 and fourth carrier CA4 are integrally fixed to each other and fixed to the output shaft 22. The third ring gear R3 and the fourth sun gear S4 are integrally fixed to each other and selectively connected to the power transmitting member 18 through a first clutch C1.

Thus, the automatic transmission portion 20 and the differential portion 11 (power transmitting member 18) are selectively connected to each other through the first clutch C1 or the second clutch C2, which is provided to shift the automatic transmission portion 20. In other words, the first and second clutches C1, C2 function as coupling devices operable to place the power transmitting path between the power transmitting member 18 and the automatic transmission portion 20, that is, the power transmitting path between the differential portion 11 (power transmitting member 18) and the drive wheels 34, selectively in one of a power transmitting state in which a vehicle drive force can be transmitted through the power transmitting path, and a power cut-off state in which the vehicle drive force cannot be transmitted through the power transmitting path. When at least one of the first and second clutches C1 and C2 is placed in the engaged state, the power transmitting path is placed in the power transmitting state. When both of the first and second clutches C1, C2 are placed in the released state, the power transmitting path is placed in the power cut-off state.

The automatic transmission portion 20 is operable to perform a so-called "clutch-to-clutch" shifting action to establish a selected one of gear positions by an engaging action of one of the coupling devices and a releasing action of another coupling device. The above-indicated gear positions have respective speed ratios γ (rotating speed $N_{18}$ of the power transmitting member 18/rotating speed $N_{OUT}$ of the output shaft 22) which change as geometric series. As indicated in the table of FIG. 2, the first gear position having the highest speed ratio γ1 of about 3.357, for example, is established by engaging actions of the first clutch C1 and third brake B3, and the second gear position having the speed ratio γ2 of about 2.180, for example, which is lower than the speed ratio γ1, is established by engaging actions of the first clutch C1 and second brake B2. Further, the third gear position having the speed ratio γ3 of about 1.424, for example, which is lower than the speed ratio γ2, is established by engaging actions of the first clutch C1 and first brake B1, and the fourth gear position having the speed ratio γ4 of about 1.000, for example, which is lower than the speed ratio γ3, is established by engaging actions of the first clutch C1 and second clutch C2. The reverse gear position having the speed ratio γR of about 3.209, for example, which is intermediate between the speed ratios γ1 and γ2, is established by engaging actions of the second clutch C2 and the third brake B3, and the neutral position N is established when all of the first clutch C1, second clutch C2, first brake B1, second brake B2 and third brake B3 are placed in the released state.

The above-described first clutch C1, second clutch C2, first brake B1, second brake B2 and third brake B3 (hereinafter collectively referred to as clutches C and brakes B, unless otherwise specified) are hydraulically operated frictional coupling devices used in a conventional vehicular automatic transmission. Each of these frictional coupling devices is constituted by a wet-type multiple-disc clutch including a plurality of friction plates which are forced against each other by a hydraulic actuator, or a band brake including a rotary drum and one band or two bands which is/are wound on the outer circumferential surface of the rotary drum and tightened at one end by a hydraulic actuator. Each of the clutches C1, C2 and brakes B1-B3 is selectively engaged for connecting two members between which each clutch or brake is interposed.

In the transmission mechanism 10 constructed as described above, the differential portion 11 functioning as the continuously-variable transmission and the automatic transmission portion 20 functioning as the step-variable transmission cooperate to constitute a continuously-variable transmission the speed ratio of which is continuously variable. While the differential portion 11 is controlled to hold its speed ratio constant, the differential portion 11 and the automatic transmission portion 20 cooperate to constitute a step-variable transmission the speed ratio of which is variable in steps.

Described in detail, when the differential portion 11 functions as the continuously-variable transmission while the automatic transmission portion 20 connected in series to the differential portion 11 functions as the step-variable transmission, the speed of the rotary motion transmitted to the automatic transmission portion 20 placed in a selected one of the gear positions M (hereinafter referred to as "input speed of the automatic transmission portion 20"), namely, the rotating speed of the power transmitting member 18 (hereinafter referred to as "transmitting member speed $N_{18}$") is continuously changed, so that the speed ratio of the drive system when the automatic transmission portion 20 is placed in the selected gear position M is continuously variable over a predetermined range. Accordingly, an overall speed ratio γT of the transmission mechanism 10 (rotating speed $N_{IN}$ of the input shaft 14/rotating speed $N_{OUT}$ of the output shaft 22) is continuously variable. Thus, the transmission mechanism 10 as a whole is operable as a continuously-variable transmission. The overall speed ratio γT is determined by the speed ratio γ0 of the differential portion 11 and the speed ratio γ of the automatic transmission portion 20.

For example, the transmitting-member speed $N_{18}$ is continuously variable over the predetermined range when the automatic transmission portion 20 is placed in a selected one of the first through fourth gear positions and reverse gear position as indicated in the table of FIG. 2. Accordingly, the overall speed ratio γT of the transmission mechanism 10 is continuously variable across the adjacent gear positions.

When the speed ratio γ0 of the differential portion 11 is held constant while the clutches C and brakes B are selectively engaged to establish the selected one of the first through fourth gear positions and the reverse gear position, the overall speed ratio γT of the transmission mechanism 10 is variable in step as geometric series. Thus, the transmission mechanism 10 is operable like a step-variable transmission.

When the speed ratio γ0 of the differential portion 11 is held constant at 1, for example, the overall speed ratio γT of the transmission mechanism 10 changes as the automatic transmission portion 20 is shifted from one of the first through fourth gear positions and reverse gear position to another, as indicated in the table of FIG. 2. When the speed ratio γ0 of the differential portion 11 is held constant at a value smaller than 1, for example, at about 0.7, while the automatic transmission portion 20 is placed in the fourth gear position, the overall speed ratio γT of the transmission mechanism 10 is controlled to be about 0.7.

Figure 3:
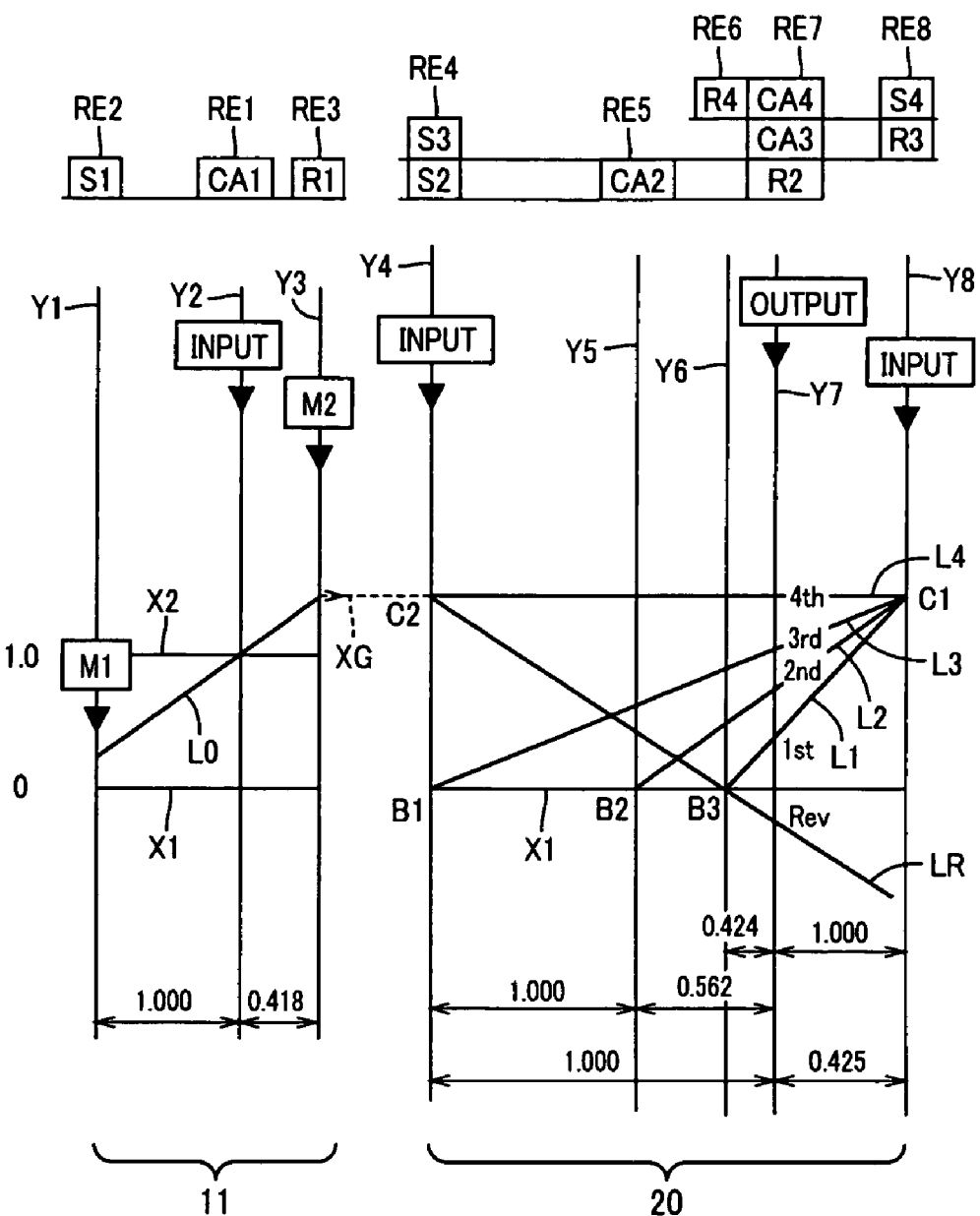
FIG. 3 is a collinear chart indicating relative rotating speeds of rotary elements of the drive system of FIG. 1 in each of the gear positions.

The collinear chart of FIG. 3 indicates, by straight lines, a relationship among the rotating speeds of the rotary elements in each of the gear positions of the transmission mechanism 10, which is constituted by the differential portion 11 and the automatic transmission portion 20. The different gear positions correspond to respective different states of connection of the rotary elements. The collinear chart of FIG. 3 is a rectangular two-dimensional coordinate system in which the gear ratios ρ of the planetary gear sets 24, 26, 28, 30 are taken along the horizontal axis, while the relative rotating speeds of the rotary elements are taken along the vertical axis. The horizontal line X1 indicates the rotating speed of 0, while the horizontal line X2 indicates the rotating speed of 1.0, that is, an operating speed $N_E$ of the engine 8 connected to the input shaft 14. The horizontal line XG indicates the rotating speed of the power transmitting member 18.

Three vertical lines Y1, Y2 and Y3 corresponding to the power distributing mechanism 16 of the differential portion 11 respectively represent the relative rotating speeds of a second rotary element (second element) RE2 in the form of the first sun gear S1, a first rotary element (first element) RE1 in the form of the first carrier CA1, and a third rotary element (third element) RE3 in the form of the first ring gear R1. The distances between the adjacent ones of the vertical lines Y1, Y2 and Y3 are determined by the gear ratio ρ1 of the first planetary gear set 24. That is, the distance between the vertical lines Y1 and Y2 corresponds to "1", while the distance between the vertical lines Y2 and Y3 corresponds to the gear ratio ρ1. Further, five vertical lines Y4, Y5, Y6, Y7 and Y8 corresponding to the transmission portion 20 respectively represent the relative rotating speeds of a fourth rotary element (fourth element) RE4 in the form of the second and third sun gears S2, S3 integrally fixed to each other, a fifth rotary element (fifth element) RE5 in the form of the second carrier CA2, a sixth rotary element (sixth element) RE6 in the form of the fourth ring gear R4, a seventh rotary element (seventh element) RE7 in the form of the second ring gear R2 and third and fourth carriers CA3, CA4 that are integrally fixed to each other, and an eighth rotary element (eighth element) RE8 in the form of the third ring gear R3 and fourth sun gear S4 integrally fixed to each other. The distances between the adjacent ones of the vertical lines are determined by the gear ratios ρ2, ρ3 and ρ4 of the second, third and fourth planetary gear sets 26, 28, 30. In the relationship among the vertical lines of the collinear chart, the distances between the sun gear and carrier of each planetary gear set corresponds to "1", while the distances between the carrier and ring gear of each planetary gear set corresponds to the gear ratio ρ. In the differential portion 11, the distance between the vertical lines Y1 and Y2 corresponds to "1", while the distance between the vertical lines Y2 and Y3 corresponds to the gear ratio ρ. In the automatic transmission portion 20, the distance between the sun gear and carrier of each of the second, third and fourth planetary gear sets 26, 28, 30 corresponds to "1", while the distance between the carrier and ring gear of each planetary gear set 26, 28, 30 corresponds to the gear ratio ρ.

Referring to the collinear chart of FIG. 3, the power distributing mechanism 16 (differential portion 11) of the transmission mechanism 10 is arranged such that the first rotary element RE1 (first carrier CA1) of the first planetary gear set 24 is integrally fixed to the input shaft 14 (engine 8), and the second rotary element RE2 is fixed to the first electric motor M1, while the third rotary element RE3 (first ring gear R1) is fixed to the power transmitting member 18 and the second electric motor M2, so that a rotary motion of the input shaft 14 is transmitted (input) to the automatic transmission portion 20 through the power transmitting member 18. A relationship between the rotating speeds of the first sun gear S1 and the first ring gear R1 is represented by an inclined straight line L0 which passes a point of intersection between the lines Y2 and X2.

In the differential state of the differential portion 11 in which the first through third rotary elements RE1-RE3 are rotatable relative to each other, for example, the rotating speed of the first sun gear S1, that is, the rotating speed of the first electric motor M1, which is represented by a point of intersection between the straight line L0 and the vertical line Y1, is raised or lowered by controlling the engine speed $N_E$, so that the rotating speed of the first carrier CA1 represented by a point of intersection between the straight line L0 and the vertical line Y2, if the rotating speed of the first ring gear R1 represented by a point of intersection between the straight line L0 and the vertical line Y3 is substantially held constant at a value determined by the vehicle speed V.

When the rotating speed of the first electric motor M1 is controlled such that the speed ratio γ0 of the differential portion 11 is held at 1, so that the rotating speed of the first sun gear S1 is made equal to the engine speed $N_E$, the straight line L0 is aligned with the horizontal line X2, so that the first ring gear R1, that is, the power transmitting member 18 is rotated at the engine speed $N_E$. When the rotating speed of the first electric motor M1 is controlled such that the speed ratio γ0 of the differential portion 11 is held at a value lower than 1, for example at 0.7, on the other hand, so that the rotating speed of the first sun gear S1 is zeroed, the power transmitting member 18 is rotated at a speed $N_{18}$ higher than the engine speed $N_E$.

In the automatic transmission portion 20, the fourth rotary element RE4 is selectively connected to the power transmitting member 18 through the second clutch C2, and selectively fixed to the casing 12 through the first brake B1, and the fifth rotary element RE5 is selectively fixed to the casing 12 through the second brake B2, while the sixth rotary element RE6 is selectively fixed to the casing 12 through the third brake B3. The seventh rotary element RE7 is fixed to the output shaft 22, while the eighth rotary element RE8 is selectively connected to the power transmitting member 18 through the first clutch C1.

The automatic transmission portion 20 is placed in the first gear position when the first clutch C1 and the third brake B3 are engaged in the state of the differential portion 11 in which a rotary motion of the differential portion 11 at a speed equal to the engine speed $N_E$ is input to the eighth rotary element RE8 of the automatic transmission portion 20, with the straight line L0 being aligned with the horizontal line X2. The rotating speed of the output shaft 22 in the first gear position is represented by a point of intersection between the vertical line Y7 indicative of the rotating speed of the seventh rotary element RE7 fixed to the output shaft 22 and an inclined straight line L1 which passes a point of intersection between the vertical line Y8 indicative of the rotating speed of the eighth rotary element RE8 and the horizontal line X2, and a point of intersection between the vertical line Y6 indicative of the rotating speed of the sixth rotary element RE6 and the horizontal line X1, as indicated in FIG. 3. Similarly, the rotating speed of the output shaft 22 in the second gear position established by the engaging actions of the first clutch C1 and second brake B2 is represented by a point of intersection between an inclined straight line L2 determined by those engaging actions and the vertical line Y7 indicative of the rotating speed of the seventh rotary element RE7 fixed to the output shaft 22. The rotating speed of the output shaft 22 in the third gear position established by the engaging actions of the first clutch C1 and first brake B1 is represented by a point of intersection between an inclined straight line L3 determined by those engaging actions and the vertical line Y7 indicative of the rotating speed of the seventh rotary element RE7 fixed to the output shaft 22. The rotating speed of the output shaft 22 in the fourth gear position established by the engaging actions of the first clutch C1 and second clutch C2 is represented by a point of intersection between a horizontal line L4 determined by those engaging actions and the vertical line Y7 indicative of the rotating speed of the seventh rotary element RE7 fixed to the output shaft 22.

FIG. 4 illustrates signals received by an electronic control device 80 provided to control the transmission mechanism 10, and signals generated by the electronic control device 80. This electronic control device 80 includes a so-called microcomputer incorporating a CPU, a ROM, a RAM and an input/output interface, and is arranged to process the signals according to programs stored in the ROM while utilizing a temporary data storage function of the RAM, to implement hybrid drive controls of the engine 8 and first and second electric motors M1 and M2, and drive controls such as shifting controls of the automatic transmission portion 20.

The electronic control device 80 is arranged to receive various sensors and switches shown in FIG. 4, various signals such as: a signal indicative of a temperature $TEMP_W$ of cooling water of the engine 8; a signal indicative of a selected one of operating positions $P_{SH}$ of a shift lever 52 (shown in FIG. 6), and a signal indicative of the number of operations of the shift lever 52 while the shift lever 52 is placed in a position M; a signal indicative of the operating speed $N_E$ of the engine 8; a signal indicative of a value indicating a selected group of forward-drive positions of the transmission mechanism; a signal indicative of an M mode (manual shifting mode); a signal indicative of an operated state of an air conditioner; a signal indicative of a vehicle speed V corresponding to the rotating speed $N_{OUT}$ of the output shaft 22 (hereinafter referred to as "output shaft speed"); a signal indicative of a temperature $T_{OIL}$ of a working oil of the automatic transmission portion 20; a signal indicative of an operated state of a side brake; a signal indicative of an operated state of a foot brake; a signal indicative of a temperature of a catalyst; a signal indicative of a required amount of an output of the vehicle in the form of an amount or angle of operation $A_{CC}$ of a manually operable vehicle accelerating member in the form of an accelerator pedal; a signal indicative of an angle of a cam; a signal indicative of the selection of a snow drive mode; a signal indicative of a longitudinal acceleration value G of the vehicle; a signal indicative of the selection of an auto-cruising drive mode; a signal indicative of a weight of the vehicle; signals indicative of speeds of the drive wheels of the vehicle; a signal indicative of a rotating speed $N_{M1}$ of the first electric motor M1 (hereinafter referred to as "first electric motor speed $N_{M1}$); a signal indicative of a rotating speed $N_{M2}$ of the second electric motor M2 (hereinafter referred to as "second electric motor speed $N_{M2}$); and a signal indicative of an amount of electric energy SOC stored in an electric-energy storage device 56 (shown in FIG. 7).

The electronic control device 80 is further arranged to generate various signals such as: control signals to be applied to an engine output control device 58 (shown in FIG. 7) to control the output of the engine 8, such as a drive signal to drive a throttle actuator 64 for controlling an angle of opening $\theta_{TH}$ of an electronic throttle valve 62 disposed in a suction pipe 60 of the engine 8, a signal to control an amount of injection of a fuel by a fuel injecting device 66 into the suction pipe 60 or cylinders of the engine 8, a signal to be applied to an ignition device 68 to control the ignition timing of the engine 8, and a signal to adjust a supercharger pressure of the engine 8; a signal to operate the electric air conditioner; signals to operate the first and second electric motors M1 and M2; a signal to operate a shift-range indicator for indicating the selected operating or shift position of the shift lever 52; a signal to operate a gear-ratio indicator for indicating the gear ratio; a signal to operate a snow-mode indicator for indicating the selection of the snow drive mode; a signal to operate an ABS actuator for anti-lock braking of the wheels; a signal to operate an M-mode indicator for indicating the selection of the M-mode; signals to operate solenoid-operated valves in the form of solenoid-operated valves (linear solenoid valves) incorporated in a hydraulic control unit 70 (shown in FIGS. 5 and 7) provided to control the hydraulic actuators of the hydraulically operated frictional coupling devices of the differential portion 11 and automatic transmission portion 20; a signal to operate a regulator valve incorporated in the hydraulic control unit 70, to regulate a line pressure PL; a signal to operate an electrically operated hydraulic pump, which is a hydraulic pressure source for generating a hydraulic pressure that is regulated to the line pressure PL; a signal to drive an electric heater; and a signal to be applied to a cruise-control computer.

Figure 5:
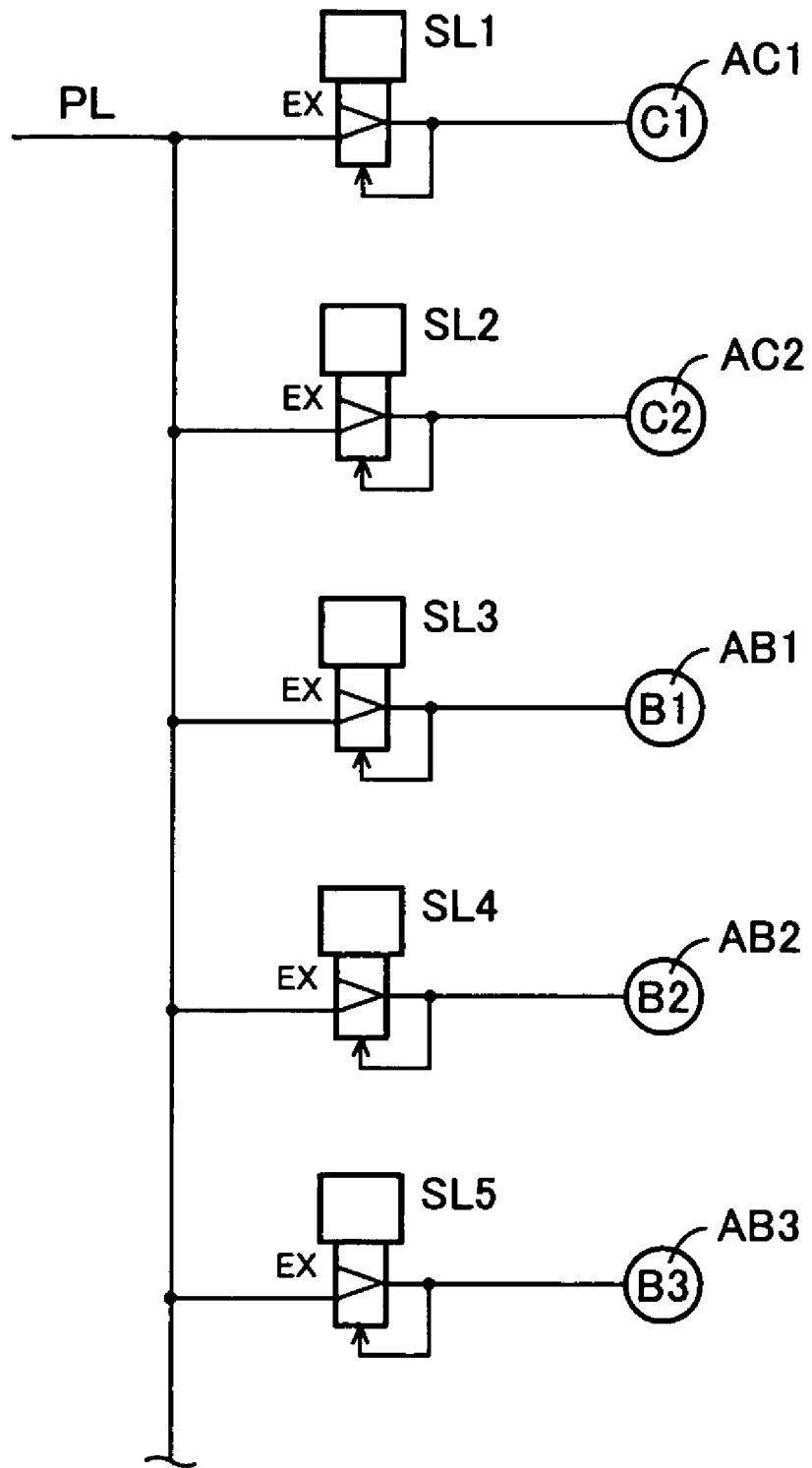
FIG. 5 is a hydraulic circuit diagram relating to linear solenoid valves for controlling hydraulic actuators of clutches C and brakes B.

FIG. 5 shows a hydraulic circuit of the hydraulic control unit 70 arranged to control the linear solenoid valves SL1-SL5 for controlling hydraulic actuators (hydraulic cylinders) AC1, AC2, AB1, AB2 and AB3 for actuating the clutches C1, C2 and brakes B1-B3.

As shown in FIG. 5, the hydraulic actuators AC1, AC2, AB1, AB2, AB3 are connected to the respective linear solenoid valves SL1-SL5, which are controlled according to control commands from the electronic control device 80, for adjusting the line pressure PL into respective engaging pressures PC1, PC2, PB1, PB2 and PB3 to be applied directly to the respective hydraulic actuators AC1, AC2, AB1, AB2, AB3. The line pressure PL is a pressure which is generated by an electrically operated hydraulic oil pump (not shown) or a mechanical oil pump driven by the engine 30, and which is regulated by a relief-type pressure regulator valve according to a load of the engine 8 represented by the accelerator pedal operation amount $A_{CC}$ or the throttle valve opening angle $\theta_{TH}$, for example.

The linear solenoid valves SL1-SL6 have substantially the same construction, and are controlled independently of each other by the electronic control device 80, to adjust the hydraulic pressures of the hydraulic actuators AC1, AC2, AB1, AB2, AB3 independently of each other, for controlling the engaging pressures PC1, PC2, PB1, PB2, PB3 of the clutches C1, C2 and brakes B1-B3, to shift the automatic transmission portion 20 to the selected operating positions or gear positions, with the appropriate coupling devices being engaged as indicated in the table of FIG. 2. A shifting action of the automatic transmission portion 20 from one position to another is a so-called "clutch-to-clutch" shifting action involving an engaging action of one of the clutches C and brakes B and a releasing action of another of the clutches and brakes, which take place concurrently.

Figure 6:
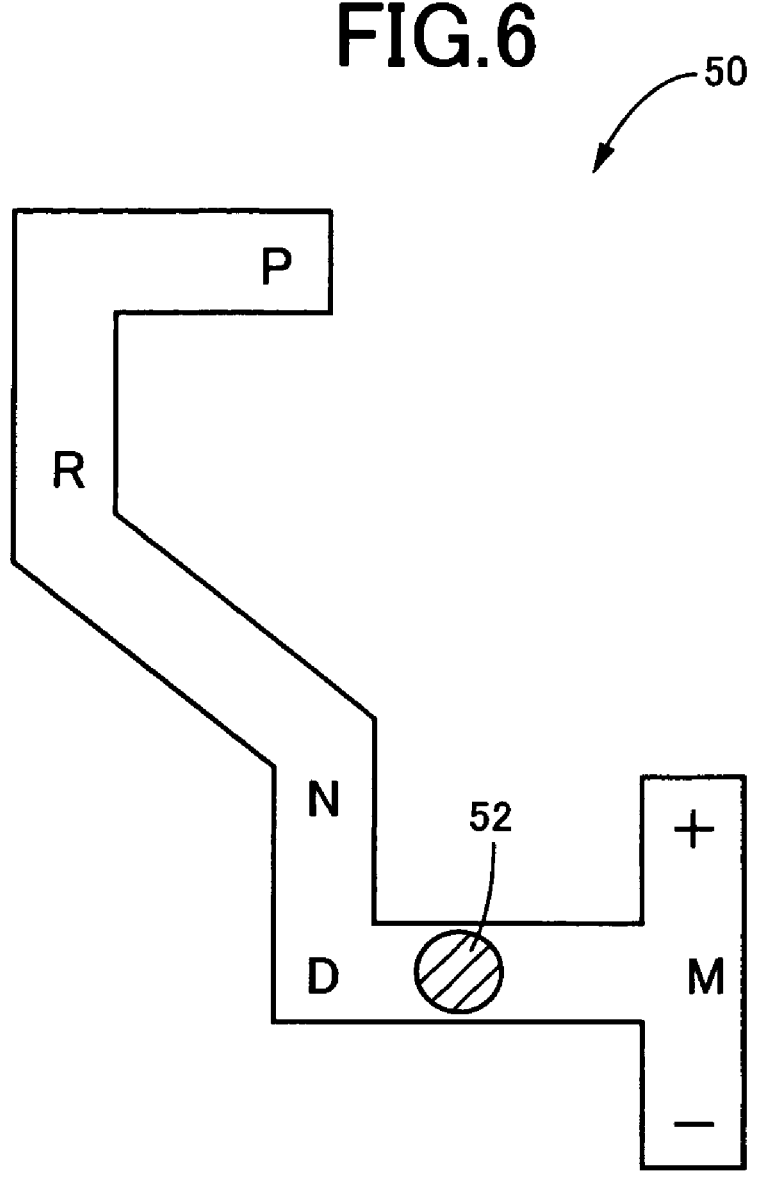
FIG. 6 is a view showing an example of a manually operated shifting device including a shift lever and operable to select one of a plurality of shift positions.

FIG. 6 shows an example of a manually operable shifting device in the form of a shifting device 50 to selected one of the plurality of shift positions $P_{SH}$. The shifting device 50 includes the shift lever 52, which is disposed laterally adjacent to an operator's seat of the vehicle, for example, and which is manually operated to select one of the plurality of operating positions $P_{SH}$.

The operating positions $P_{SH}$ of the shift lever 52 consists of: a parking position P for placing the drive system 10 (namely, automatic transmission portion 20) in a neutral state in which a power transmitting path through the automatic transmission portion 20 is disconnected while at the same time the output shaft 22 is placed in the locked state; a reverse-drive position R for driving the vehicle in the rearward direction; a neutral position N for placing the drive system 10 in the neutral state; an automatic forward-drive shifting position D for establishing an automatic shifting mode; and a manual forward-drive shifting position M for establishing a manual shifting mode. In the automatic shifting mode, the overall speed ratio γT is determined by the continuously variable speed ratio of the differential portion 11 and the speed ratio of the automatic transmission portion 20 which changes in steps as a result of an automatic shifting action of the automatic transmission portion 20 from one of the first through fourth gear positions to another. In the manual shifting mode, the number of the gear positions available is limited by disabling the automatic transmission portion 20 to be shifted to the relatively high gear position or positions.

As the shift lever 52 is operated to a selected one of the shift positions $P_{SH}$, the hydraulic control unit 70 is electrically operated to switch the hydraulic circuit to establish the rear-drive position R, neutral position N, and one of the forward-drive gear positions, as indicated in the table of FIG. 2.

The above-indicated parking position P and the neutral position N are non-drive positions selected when the vehicle is not driven, while the above-indicated reverse-drive position R, and the automatic and manual forward-drive positions D, M are drive positions selected when the vehicle is driven. In the non-drive positions P, N, the power transmitting path in the automatic transmission portion 20 is in the power-cut-off state established by releasing both of the clutches C1 and C2, as shown in the table of FIG. 2. In the drive positions R, D, M, the power transmitting path in the automatic transmission portion 20 is in the power-transmitting state established by engaging at least one of the clutches C1 and C2, as also shown in the table of FIG. 2.

Described in detail, a manual operation of the shift lever 52 from the parking position P or neutral position N to the reverse-drive position R causes the second clutch C2 to be engaged for switching the power transmitting path in the automatic transmission portion 20 from the power-cut-off state to the power-transmitting state. A manual operation of the shift lever 52 from the neutral position N to the automatic forward-drive position D causes at least the first clutch C1 to be engaged for switching the power transmitting path in the automatic transmission portion 20 from the power-cut-off state to the power-transmitting state. A manual operation of the shift lever 52 from the rear-drive position R to the parking position P or neutral position N cause the second clutch C2 to be released for switching the power transmitting path in the automatic transmission portion 20 from the power-transmitting state to the power-cut-off state. A manual operation of the shift lever 52 from the automatic forward-drive position D to the neutral position N causes the first clutch C1 and the second clutch C2 to be released for switching the power transmitting path from the power-transmitting state to the power-cut-off state.

The functional block diagram of FIG. 7 shows major control functions of the electronic control device 80. Step-variable shifting control means 82 shown in FIG. 7 is configured to determine whether a shifting action of the automatic transmission portion 20 should take place, that is, to determine the gear position to which the automatic transmission portion 20 should be shifted. This determination is made on the basis of a condition of the vehicle represented by the vehicle speed V and a required output torque $T_{OUT}$ of the automatic transmission portion 20, and according to a stored relationship (shifting boundary line map or shifting control map) which represents shift-up boundary lines indicated by solid lines in FIG. 8 and shift-down boundary lines indicated by one-dot chain lines in FIG. 8.

The step-variable shifting control means 82 generates a command (shifting command or hydraulic control command) to be applied to the hydraulic control unit 70, to implement the clutch-to-clutch shifting action, by respectively engaging and releasing the appropriate two hydraulically operated frictional coupling devices, for establishing the determined gear position of the automatic transmission portion 20 according to the table of FIG. 2. According to this command, the hydraulic control unit 70 controls the appropriate two linear solenoid valves SL, for activating the hydraulic actuators of the appropriate two frictional coupling devices to concurrently engage one of the two frictional coupling devices and release the other frictional coupling device.

The hybrid control means 84 controls the engine 8 to be operated with high efficiency, and controls the first and second electric motors M1, M2 so as to optimize a proportion of drive forces generated by the engine 8 and the second electric motor M2, and a reaction force generated by the first electric motor M1 during its operation as the electric generator, for thereby controlling the speed ratio 70 of the differential portion 11 operating as the electric continuously-variable transmission. For instance, the hybrid control means 84 calculates a target (required) vehicle output at the present running speed V of the vehicle, on the basis of the operation amount $A_{CC}$ of the accelerator pedal used as an operator's required vehicle output and the vehicle running speed V, and calculate a target total vehicle output on the basis of the calculated target vehicle output and a required amount of generation of an electric energy by the first electric motor M1. The hybrid control means 84 calculates a target output of the engine 8 to obtain the calculated target total vehicle output, while taking account of a power transmission loss, a load acting on various devices of the vehicle, an assisting torque generated by the second electric motor M2, etc. The hybrid control means 84 controls the speed $N_E$ and torque $T_E$ of the engine 8, so as to obtain the calculated target engine output, and the amount of generation of the electric energy by the first electric motor M1.

Figure 9:
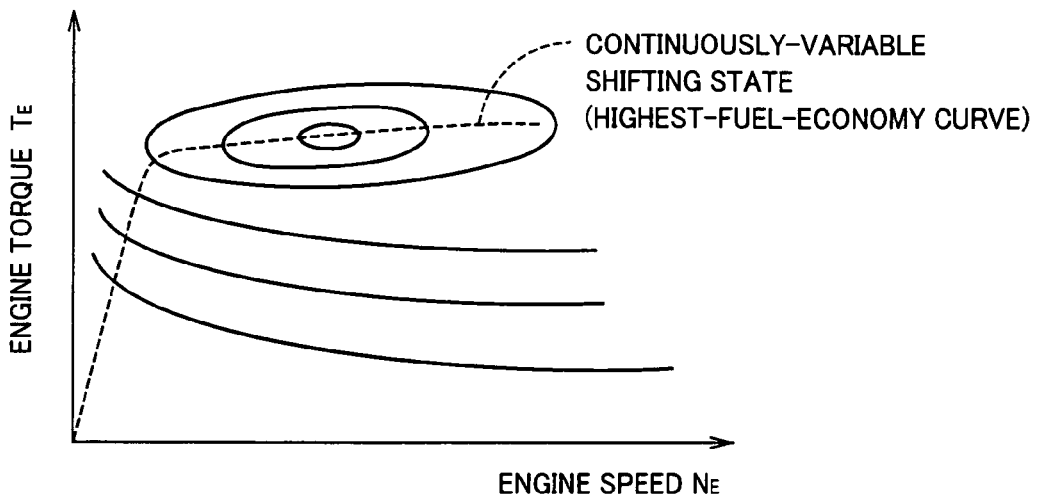
FIG. 9 is a view illustrating an example of a fuel consumption map defining a highest-fuel-economy curve of an engine, the curve being indicated by broken line.

For example, the hybrid control means 84 is arranged to implement the hybrid control while taking account of the presently selected gear position of the automatic transmission portion 20, so as to improve the drivability of the vehicle and the fuel economy of the engine 8. In the hybrid control, the differential portion 11 is controlled to function as the electric continuously-variable transmission, for optimum coordination of the engine speed $N_E$ for its efficient operation, and the rotating speed of the power transmitting member 18 determined by the vehicle speed V and the selected gear position of the transmission portion 20. That is, the hybrid control means 82 determines a target value of the overall speed ratio γT of the transmission mechanism 10, so that the engine 8 is operated according to a stored highest-fuel-economy curve (fuel-economy map or relationship) indicated by broken line in FIG. 9. The target value of the overall speed ratio γT of the transmission mechanism 10 permits the engine torque $T_E$ and speed $N_E$ to be controlled so that the engine 8 provides an output necessary for obtaining the target vehicle output (target total vehicle output or required vehicle drive force). The highest-fuel-economy curve is obtained by experimentation so as to satisfy both of the desired operating efficiency and the highest fuel economy of the engine 8, and is defined in a two-dimensional coordinate system defined by an axis of the engine speed $N_E$ and an axis of the engine torque $T_E$. The hybrid control means 82 controls the speed ratio γ0 of the differential portion 11, so as to obtain the target value of the overall speed ratio γT, so that the overall speed ratio γT can be controlled within a predetermined range.

In the hybrid control, the hybrid control means 84 controls an inverter 54 such that the electric energy generated by the first electric motor M1 is supplied to an electric-energy storage device 56 and the second electric motor M2 through the inverter 54. That is, a major portion of the drive force produced by the engine 8 is mechanically transmitted to the power transmitting member 18, while the remaining portion of the drive force is consumed by the first electric motor M1 to convert this portion into the electric energy, which is supplied through the inverter 54 to the second electric motor M2, so that the second electric motor M2 is operated with the supplied electric energy, to produce a mechanical energy to be transmitted to the power transmitting member 18. Thus, the drive system is provided with an electric path through which an electric energy generated by conversion of a portion of a drive force of the engine 8 is converted into a mechanical energy.

The hybrid control means 84 includes engine output control means functioning to command an engine-output control device 58 for controlling the engine 8, so as to provide a required output, by controlling the throttle actuator 64 to open and close the electronic throttle valve 62, and controlling an amount and time of fuel injection by the fuel injecting device 66 into the engine 8, and the timing of ignition of the igniter by the ignition device 68, alone or in combination.

For instance, the hybrid control means 84 is basically arranged to control the throttle actuator 60 on the basis of the operation amount $A_{CC}$ of the accelerator pedal and according to a predetermined stored relationship (not shown) between the operation amount $A_{CC}$ and the opening angle $θ_{TH}$ of the electronic throttle valve 62 such that the opening angle $θ_{TH}$ increases with an increase of the operation amount $A_{CC}$. The engine output control device 58 controls the throttle actuator 64 to open and close the electronic throttle valve 62, controls the fuel injecting device 66 to control the fuel injection, and controls the ignition device 68 to control the ignition timing of the igniter, for thereby controlling the torque of the engine 8, according to the commands received from the hybrid control means 84.

The hybrid control means 84 is further arranged to hold the first electric motor speed $N_{M1}$ at a desired value, by controlling the engine speed $N_E$ owing to the electric CVT function of the differential portion 11, irrespective of whether the vehicle is stationary or running. In other words, the hybrid control means 84 is capable of controlling the engine speed $N_E$ so as to hold the first electric motor speed $N_{M1}$ at the desired value.

To lower the first electric motor speed $N_{M1}$ during running of the vehicle, for example, the hybrid control means 84 lowers the engine speed $N_E$ while holding the second electric motor speed $N_{M2}$ substantially constant, since the second electric motor speed $N_{M2}$ is determined by the vehicle speed V (speed of the drive wheels 34), as is apparent from the collinear chart of FIG. 3.

The hybrid control means 84 is capable of establishing a motor-drive mode to drive the vehicle by the electric motor, by utilizing the electrically controlled continuously shifting function (differential function) of the differential portion 11, irrespective of whether the engine 8 is in the non-operated state or in the idling state.

Figure 8:
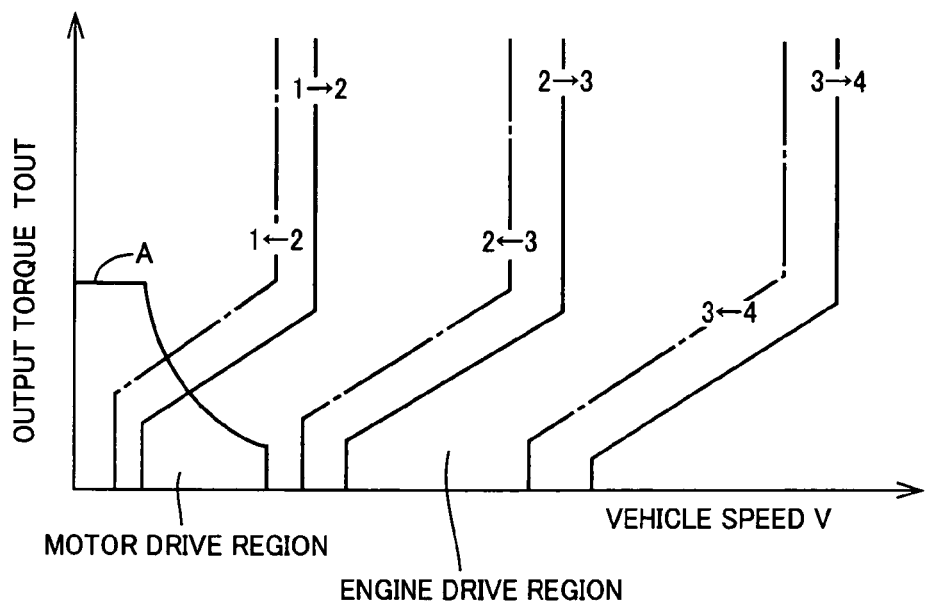
FIG. 8 is a view illustrating an example of a stored shifting boundary line map used for controlling the shifting actions of the drive system, and an example of a stored drive-power-source switching boundary line map used for switching between an engine drive mode and a motor drive mode, in relation to each other.

The hybrid control means 52 is configured to establish the motor-drive mode or an engine-drive mode, on the basis of the vehicle condition represented by the actual vehicle speed V and the required output torque $T_{OUT}$ of the automatic transmission portion 20, and according to a stored relationship (drive-power-source switching map) which represents a boundary line between an engine-drive region and a motor-drive region for switching the vehicle drive power source between the engine 8 and the second electric motor M2. The drive-power-source switching map is defined by parameters in the form of the vehicle speed V and the output torque $T_{OUT}$ of the automatic transmission portion 20, as indicated in FIG. 8. The hybrid control means 52 selects the motor-drive mode or the engine-drive mode, depending upon whether the vehicle condition is in the engine-drive region or the motor-drive region. In FIG. 8, solid line A indicates the boundary line of the drive-power-source switching map, which is stored together with the shifting boundary line map indicated by solid lines and one-dot chain lines also indicated in FIG. 8. Generally, the motor-drive mode is established when the output torque $T_{OUT}$ is in a comparatively low range in which the engine operating efficiency is comparatively low, namely, when the engine torque $T_E$ is in a comparatively low range, or when the vehicle speed V is in a comparatively low range, that is, when the vehicle load is comparatively low.

For reducing a dragging of the engine 8 in its non-operated state and improving the fuel economy in the motor-drive mode, the hybrid control means 84 is configured to hold the engine speed $N_E$ at zero or substantially zero as needed, owing to the electric CVT function (differential function) of the differential portion 11, that is, by controlling the differential portion 11 to perform its electric CVT function (differential function), so that the first electric motor speed 1 is controlled to be in a non-load state, so as to be freely rotated to have a negative speed $N_{M1}$.

The hybrid control means 84 is further capable of performing a so-called "drive-force assisting" operation (torque assisting operation) to assist the engine 8, even in the engine-drive region of the vehicle condition, by supplying an electric energy from the first electric motor M1 or the electric-energy storage device 56 to the second electric motor M2 through the above-described electric path, so that the second electric motor M2 is operated to transmit a drive torque to the drive wheels 34.

The hybrid control means 84 is further configured to place the first electric motor M1 in a non-load state in which the first electric motor M1 is freely rotated, so that the differential portion 11 is placed in a state similar to the power cut-off state in which power cannot be transmitted through the power transmitting path within the differential portion 11, and no output can be generated from the differential portion 11. Namely, the hybrid control means 84 is arranged to place the first electric motor M1 in the non-load state, for thereby placing the differential portion 11 in a neutral state in which the power transmitting path is electrically cut off.

The shifting boundary line map shown in FIG. 8 is set to define the shift-up boundary lines and the shift-down boundary lines for selecting the gear positions (speed ratios) of the automatic transmission portion 20, so as to prevent an excessive rise of the first electric motor speed $N_{M1}$ (beyond an upper limit of about 10000 rpm, for example), while taking account of the durability of the first electric motor M1. That is, the shift-up boundary lines and the shift-down boundary lines are set to prevent the excessive rise of the first electric motor speed $N_{M1}$, which is determined on the basis of a speed relationship in the differential portion 11 among: the transmitting-member speed $N_{18}$ (=output shaft speed $N_{OUT}$×speed ratio γ) determined by the output shaft speed $N_{OUT}$ and the speed ratio γ of the automatic transmission portion 20; the engine speed $N_E$; and the first electric motor speed $N_{M1}$.

However, if a shifting action of the automatic transmission portion 20 does not follow the shifting boundary line map due to a failure of any of the linear solenoid valves SL1-SL5 for the shifting actions, an excessive rise of the first electric motor speed $N_{M1}$ may take place, namely, the first electric motor speed $N_{M1}$ enters an excessive rise range, giving rise to a risk of deterioration of the durability of the first electric motor M1. Where a failure of any of the linear solenoid valves SL1-SL5 causes a shifting action to the third gear position having a lower speed ratio than the second gear position that should be normally established according to the shifting boundary line map, the transmitting-member speed $N_{18}$ is made lower in the third gear position than in the second gear position, so that the first electric motor speed $N_{M1}$ rises into the excessive rise range in the absence of a change of the engine speed $N_E$, giving rise to a risk of deterioration of the durability of the first electric motor M1.

In view of the above-indicated risk, the control apparatus of the present embodiment includes engine speed limiting means 86 configured to limit a speed range of the engine 8 according to the speed ratio γ of the automatic transmission portion 20, so as to prevent the first electric motor speed $N_{m1}$ from entering the excessive rise range.

Described in detail, shift position determining means 88 is provided to determine whether the shift lever 52 is placed in a forward-drive position, that is, in the forward-drive position D or M. This determination is made on the basis of the signal indicative of the selected shift position $P_{SH}$ of the shift lever 52.

Failure-gear-position determining means 90 is provided to determine whether the automatic transmission portion 20 is placed in a gear position (hereinafter referred to as "a failure gear position") established as a result of a failure to perform shifting actions according to the shifting boundary line map of FIG. 8. This determination is made when the shift position determining means 86 has determined that the shift lever 52 is placed in the forward-drive position. For example, the failure-gear-position determining means 90 is configured to calculate the actual speed ratio γ on the basis of the actual transmitting-member speed $N_{18}$ and the actual output shaft speed $N_{OUT}$, and determine whether the automatic transmission portion 20 is placed in the failure gear position, by determining whether the calculated actual speed ratio γ is equal to the speed ratio of the gear position that should be selected by the step-variable shifting control means 82 according to the shifting boundary line map of FIG. 8.

The above-described engine speed limiting means 86 is configured to determine whether the first electric motor speed $N_{M1}$ is expected to enter into the excessive rise range, when the fail-gear-position determining means 90 has determined that the automatic transmission portion 20 is placed in any fail gear position. If it is determined that the first electric motor speed $N_{M1}$ is expected to enter into the excessive rise range, the engine speed limiting means 86 limits the upper limit of the engine speed $N_E$ on the basis of the vehicle speed V.

Figure 10:
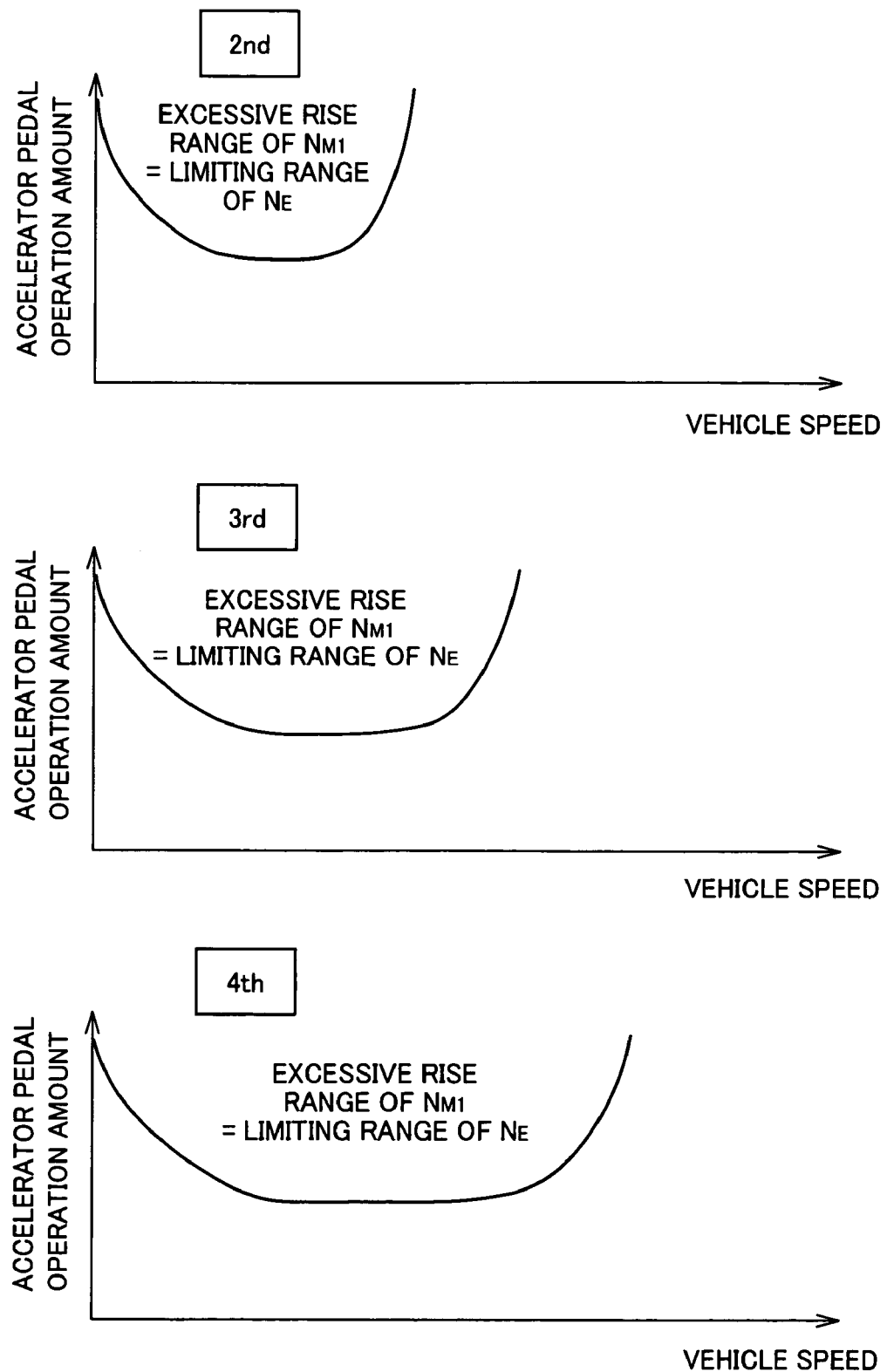
FIG. 10 is a view indicating examples of an excessive rise range map used for an engine speed limiting control for respective failure gear positions.

FIG. 10 indicates examples of a stored excessive rise range map of the first electric motor speed $N_{M1}$ (engine speed limiting ranges) defined by the vehicle speed V and an engine load in the form of the accelerator pedal operation amount $A_{CC}$. The examples are the excessive rise range maps corresponding to the respective different failure gear positions. As indicated in FIG. 10, the excessive rise range maps are determined such that the excessive rise ranges of the first electric motor speed $N_{M1}$ for the respective failure gear positions are provided at relatively low values of the vehicle speed V, in view of a fact that the transmitting-member speed $N_{18}$ decreases with a decrease of the vehicle speed V in each gear position so that the first electric motor speed $N_{M1}$ is likely to enter into the excessive rise range when the vehicle speed V is relatively low. As also indicated in FIG. 10, the maps are determined such that upper limits of the vehicle speed V of the excessive rise ranges of the first electric motor speed $N_{M1}$ increase with a decrease of the speed ratio of the failure gear positions, in view of a fact that the transmitting-member speed $N_{18}$ decreases with a decrease of the speed ratio of the gear positions at the same value of the vehicle speed V so that the first electric motor speed $N_{M1}$ is likely to enter into the excessive rise range when the speed ratio of the gear positions is relatively low. The vehicle speed values V at which the gear positions are established increase with the decrease of the speed ratio of the gear positions.

According to the excessive rise range map for each failure gear position indicated in FIG. 10, the excessive rise of the first electric motor speed $N_{M1}$ is limited at a relatively large value of the accelerator pedal operating amount at an extremely low vehicle speed. However, this manner of limitation is not essential where it is desired to prevent deterioration of acceleration performance of the vehicle upon or during staring and driving of the vehicle by the engine.

Figure 11:
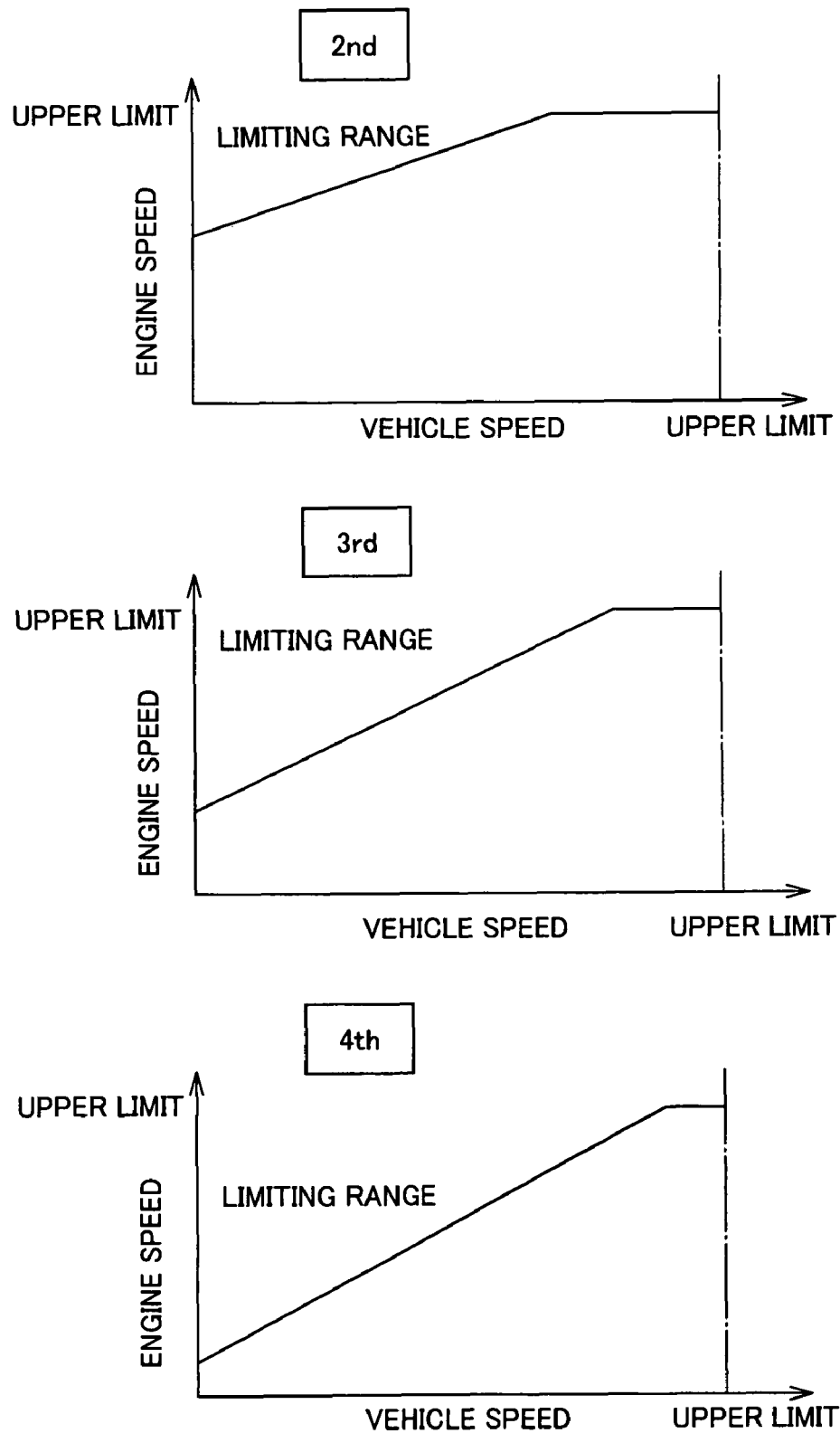
FIG. 11 is a view indicating examples of an upper engine speed limit map used for the engine speed limiting control for the respective failure gear positions.

FIG. 11 indicates examples of a stored relationship (an upper engine speed limit map) which represents an upper limit of the engine speed $N_E$ and which is defined by the vehicle speed V and the engine speed $N_E$. The examples are the upper engine speed limit maps corresponding to the respective different failure gear positions. As indicated in FIG. 11, the upper engine speed limit maps are determined such that upper limit ranges of the engine speed $N_E$ (limiting ranges of the engine speed $N_E$ to prevent the first electric motor speed $N_{M1}$ from entering the excessive rise range) for the respective failure gear positions are provided at relatively low values of the vehicle speed V, and such that the upper engine speed limits decrease with a decrease of the vehicle speed V, in view of the fact that the transmitting-member speed $N_{18}$ decreases with a decrease of the vehicle speed V in each gear position so that the first electric motor speed $N_{M1}$ is likely to enter into the excessive rise range when the vehicle speed V is relatively low. As also indicated in FIG. 11, the upper engine speed limit maps are determined such that the upper engine speed limits at the same value of the vehicle speed V decrease with a decrease of the speed ratio of the failure gear positions, and such that the upper limits of the vehicle speed V of the upper engine speed limit ranges of the engine speed $N_E$ increase with the decrease of the speed ratio of the failure gear positions, in view of the fact that the first electric motor speed $N_{M1}$ is likely to enter into the excessive rise range when the speed ratio of the gear positions is relatively low.

For example, the engine speed limiting means 86 makes the determination as to whether the first electric motor speed $N_{M1}$ is expected to enter into the excessive rise range, on the basis of the actual vehicle speed V and accelerator pedal operation amount $A_{CC}$ and according to the appropriate excessive rise range map of FIG. 10. When the engine speed limiting means 86 determines that the first electric motor speed $N_{M1}$ is expected to enter into the excessive rise range, the engine speed limiting means 86 determines the upper limit of the engine speed $N_E$ on the basis of the actual vehicle speed V and according to the appropriate upper engine speed limit map of FIG. 11, and applies an engine speed limiting command to the hybrid control means 84, for limiting the engine load so as to prevent a rise of the engine speed $N_E$ beyond the determined upper limit.

According to the engine speed limiting command, the hybrid control means 84 implements a throttle valve control for limiting the throttle valve opening angle $\theta_{TH}$ to within a range not larger than an upper limit or a fuel injection control for limiting the amount of fuel injection to within a range not larger than an upper limit, to limit the engine speed $N_E$ to within a range not higher than the determined upper limit.

Thus, the engine speed limiting means 86 limits the engine speed $N_E$ to within a range not higher than the determined upper limit, for thereby controlling the first electric motor M1 so as to prevent a rise of the first electric motor speed $N_{M1}$ into the excessive rise range.

Referring to the flow chart of FIG. 12, there is illustrated a control operation performed by the electronic control device 80 to improve the durability of the first electric motor M1 by preventing an excessive rise of the operating speed of the first electric motor M1 due to a shifting action of the automatic transmission portion 20. The control operation is repeatedly performed with an extremely short cycle time of about several milliseconds to several tens of milliseconds.

The control operation of FIG. 12 is initiated with step S1 (hereinafter "step" being omitted) corresponding to the above-described shift position determining means 88, to make the determination as to whether the shift lever 52 is placed in the forward-drive position D or M, on the basis of the signal indicative of the selected shift position $P_{SH}$ of the shift lever 52.

If a negative determination is obtained in S1, the control flow goes to S6 to perform controls other than the engine speed limiting control that is implemented when a shifting control of the automatic transmission portion 20 takes place or when the automatic transmission 20 is shifted to a failure-gear-position.

If an affirmative determination is obtained in S1, the control flow goes to S2 corresponding to the above-described failure-gear-position determining means 90, to determine whether the automatic transmission portion 20 is placed in any failure gear position. For example, this determination is made by determining whether the actual speed ratio γ calculated on the basis of the actual transmitting-member speed $N_{18}$ and the output shaft speed $N_{OUT}$ is equal to the speed ratio of the gear position that should be selected according to the shifting boundary line map of FIG. 8.

If a negative determination is obtained in S2, the control flow goes to S5 corresponding to the step-variable shifting control means 82, to determine the gear position of the automatic transmission portion 20 to be established next, on the basis of the vehicle condition represented by the actual vehicle speed V and the required output torque $T_{OUT}$ of the automatic transmission portion 20, and according to the shifting boundary line map of FIG. 8, and to shift the automatic transmission portion 20 to the determined gear position.

If an affirmative determination is obtained in S2, the control flow goes to S3 corresponding to the engine speed limiting means 86, to make the determination as to whether the first electric motor speed $N_{M1}$ is expected to enter into the excessive rise range, on the basis of the actual vehicle speed V and accelerator pedal operation amount $A_{CC}$ and according to the appropriate excessive rise range map of FIG. 10. If it is determined that the first electric motor speed $N_{M1}$ is expected to enter into the excessive rise range, the upper limit of the engine speed $N_E$ is determined to prevent the excessive rise of the first electric motor speed $N_{M1}$ into the excessive rise range, on the basis of the actual vehicle speed V and according to the appropriate upper engine speed limit map of FIG. 11.

Then, the control flow goes to S4 corresponding to the engine speed limiting means 86 and the hybrid control means 94, to generate the engine speed limiting command for limiting the engine load so as to prevent a rise of the engine speed $N_E$ beyond the upper limit determined in S3, so that the engine speed $N_E$ is limited to within a range not higher than the determined upper limit, according to the engine speed limiting command, by the throttle valve control for limiting the throttle valve opening angle $\theta_{TH}$, or by the fuel injection control for limiting the amount of fuel injection.

The control apparatus according to the present embodiment of the invention is configured such that the operating speed of the engine 8 is limited to within the range not higher than the upper limit according to the speed ratio of the automatic transmission portion 20, by the engine speed limiting means 86, for preventing a rise of the first electric motor speed $N_{M1}$ into the excessive rise range, so that an excessive rise of the operating speed of the first electric motor M1 due to a shifting action of the automatic transmission portion 20 is prevented to improve the durability of the first electric motor M1. For example, the engine speed $N_E$ is limited to within the range not higher than the upper limit when the automatic transmission portion 20 is shifted to a failure gear position established as a result of a failure of the automatic transmission portion to perform shifting actions according to the shifting boundary line map indicated in FIG. 8 for illustrative purpose, so that the vehicle can be driven even in the event of the failure of the automatic transmission portion 20, while preventing an excessive rise of the speed of the first electric motor M1.

The present control apparatus is further configured such that the engine speed limiting means 86 limits the engine speed $N_E$ to within the range not higher than the upper limit, by limiting the engine load so as to prevent an excessive rise of the first electric motor speed $N_{M1}$ into the excessive rise range. Accordingly, the engine speed $N_E$ can be adequately limited to prevent an excessive rise of the operating speed of the first electric motor, for example.

The present control apparatus is further arranged such that the engine speed limiting means 86 determines the limiting range of the engine speed $N_E$ corresponding to the excessive rise range of the first electric motor speed $N_{M1}$ on the basis of the vehicle speed V. Accordingly, the engine speed $N_E$ can be adequately limited according to the transmitting-member speed $N_{18}$ determined by the vehicle speed V, so as to prevent an excessive rise of the operating speed of the first electric motor M1.

The other embodiment of this invention will then be described. In the following description, the same reference signs are used to identify the corresponding elements in the different embodiments.

Second Embodiment

In the embodiment described above, the shift-up boundary lines and the shift-down boundary lines according to the shifting boundary line map indicated in FIG. 8 are determined so as to prevent an excessive rise of the first electric motor speed $N_{M1}$. In the present embodiment, however, the shift-up boundary lines and the shift-down boundary lines used to change the gear position (speed ratio) of the automatic transmission portion 20 are determined so as to prevent an excessive rise of the rotating speed $N_{P1}$ of the first planetary gear P1 (first planetary gear speed), while taking account of the durability of the pinion gear of the first planetary gear set 24 constituting the power distributing mechanism 16, that is, the durability of the first planetary gear P1, for example, the durability of a needle bearing for a pinion shaft inserted coaxially with the first planetary gear P1 such that the first carrier CA1 supports the first planetary gear P1 rotatably about its axis and about the axis of the first planetary gear set. Namely, the shift-up and shift-down boundary lines are determined to prevent an excessive rise of the first planetary gear speed $N_{P1}$ which is determined by a speed difference $\Delta N_{P1}$ between the transmitting-member speed $N_{18}$ (rotating speed of the first ring gear R1) and the engine speed $N_E$ (rotating speed of the first carrier CA1). This first planetary gear speed $N_{P1}$ increases with an increase of the speed difference $\Delta N_{P1}$.

However, if the shifting action does not follow the shifting boundary line map due to a failure of any of the linear solenoid valves SL1-SL5 provided for the shifting actions, an excessive rise of the first planetary gear speed $N_{P1}$ may take place, namely, the first planetary gear speed $N_{P1}$ may enter an excessive rise range, giving rise to a risk of deterioration of the durability of the first planetary gear P1. Where a failure of any of the linear solenoid valves SL1-SL5 causes a shifting action to the second gear position having a higher speed ratio than the third gear position that should be normally established according to the shifting boundary line map, the transmitting-member speed $N_{18}$ is made higher in the second gear position than in the third gear position, so that the first planetary gear speed $N_{P1}$ rises into the excessive rise range in the absence of a change of the engine speed $N_E$, giving rise to a risk of deterioration of the durability of the first planetary gear P1.

In view of the above-indicated risk, the engine speed limiting means 86 is configured to limit the speed range of the engine 8 according to the speed ratio γ of the automatic transmission portion 20, so as to prevent the first planetary gear speed $N_{P1}$ from entering the excessive rise range. in place of or in addition to preventing an excessive rise of the first electric motor speed $N_{M1}$ as described above with respect to the first embodiment Described in detail, the engine speed limiting means 86 is configured to limit the lower limit of the engine speed $N_E$ on the basis of the vehicle speed V, if the failure-gear-position determining means 90 has determined that the automatic transmission portion 20 is placed in any failure gear position.

FIG. 13 indicates examples of a stored relationship (a lower engine speed limit map) which represents a lower limit of the engine speed $N_E$ and which is defined by the vehicle speed V and the engine speed $N_E$. The examples are the lower engine speed limit maps corresponding to the respective different failure gear positions. As indicated in FIG. 13, the lower engine speed limit maps are determined such that lower limit ranges of the engine speed $N_E$ (limiting ranges of the engine speed $N_E$ to prevent the first planetary gear speed $N_{P1}$ from entering the excessive rise range) for the respective failure gear positions are provided at relatively high values of the vehicle speed V, and such that the lower engine speed limits increases with an increase of the vehicle speed V, in view of the fact that the speed difference $\Delta N_{P1}$ increases with an increase of the vehicle speed V in each gear position so that the first planetary gear speed $N_{P1}$ is likely to enter into the excessive rise range when the vehicle speed V is relatively high. As also indicated in FIG. 13, the lower engine speed limit maps are determined such that the lower engine speed limits at the same value of the vehicle speed V increases with an increase of the speed ratio of the failure gear positions, and such that the lower limits of the vehicle speed V of the lower engine speed limit ranges of the engine speed $N_E$ increase with the increase of the speed ratio of the failure gear positions, in view of the fact that the first planetary gear speed $N_{P1}$ is likely to enter into the excessive rise range when the speed ratio of the gear positions is relatively high.

For example, the engine speed limiting means 86 determines the lower limit of the engine speed $N_E$ on the basis of the actual vehicle speed V and according to the appropriate lower engine speed limit map of FIG. 13, and applies an engine speed limiting command to the hybrid control means 84, for limiting the engine load so as to prevent a drop of the engine speed $N_E$ below the determined lower limit.

According to the engine speed limiting command, the hybrid control means 84 implements the throttle valve control for limiting the throttle valve opening angle $\theta_{TH}$ to within a range not smaller than a lower limit or the fuel injection control for limiting the amount of fuel injection to a range not smaller than a lower limit, to limit the engine speed $N_E$ to within a range not lower than the determined lower limit.

Referring to the flow chart of FIG. 14, there is illustrated a control operation performed by the electronic control device 80 to improve the durability of the first planetary gear P1 by preventing an excessive rise of the rotating speed of the first planetary gear P1 due to a shifting action of the automatic transmission portion 20. The control operation is repeatedly performed with an extremely short cycle time of about several milliseconds to several tens of milliseconds. The control operation of the flow chart of FIG. 14 in this embodiment corresponds to that of FIG. 12 in the preceding embodiment, and is different therefrom principally in that S3 and S4 in the flow chart of FIG. 12 are replaced by S3' and S4' in the flow chart of FIG. 14, which will be described.

If an affirmative determination is obtained in S2, the control flow goes to S3' corresponding to the engine speed limiting means 86, to determine the lower limit of the engine speed $N_E$, on the basis of the actual vehicle speed V and according to the appropriate lower engine speed limit map of FIG. 13, so as to prevent the excessive rise of the first planetary gear speed $N_{P1}$ into the excessive rise range.

Then, the control flow goes to S4' corresponding to the engine speed limiting means 86 and the hybrid control means 94, to generate the engine speed limiting command for controlling the engine load so as to prevent a drop of the engine speed $N_E$ below the lower limit determined in S3', so that the engine speed $N_E$ is limited to within a range not lower than the determined lower limit, according to the engine speed limiting command, by the throttle valve control for limiting the throttle valve opening angle $\theta_{TH}$ to within a range not smaller than a lower limit or by the fuel injection control for limiting the amount of fuel injection to within a range not smaller than a lower limit.

The control apparatus according to the present embodiment of the invention is configured such that the operating speed of the engine 8 is limited to within the range not lower than the lower limit according to the speed ratio of the automatic transmission portion 20, by the engine speed limiting means 86, for preventing a rise of the first planetary gear speed $N_{P1}$ into the excessive rise range, so that an excessive rise of the operating speed of the first planetary gear P1 due to a shifting action of the automatic transmission portion 20 is prevented to improve the durability of the first planetary gear P1. For example, the engine speed $N_E$ is limited to within the range not lower than the lower limit when the automatic transmission portion 20 is shifted to a failure gear position established as a result of a failure of the automatic transmission portion to perform shifting actions following the shifting boundary line map indicated in FIG. 8 for illustrative purpose, so that the vehicle can be driven even in the event of the failure of the automatic transmission portion 20, while preventing an excessive rise of the speed of the first planetary gear P1.

The present control apparatus is further configured such that the engine speed limiting means 86 limits the engine speed $N_E$ to within the range not lower than the lower limit, by controlling the engine load so as to prevent an excessive rise of the first planetary gear speed $N_{P1}$ into the excessive rise range. Accordingly, the engine speed $N_E$ can be adequately limited to prevent an excessive rise of the rotating speed of the first planetary gear P1, for example.

The present control apparatus is further arranged such that the engine speed limiting means 86 determines the limiting range of the engine speed $N_E$ corresponding to the excessive rise range of the first planetary gear speed $N_{P1}$ on the basis of the vehicle speed V. Accordingly, the engine speed $N_E$ can be adequately limited according to the transmitting-member speed $N_{18}$ determined by the vehicle speed V, so as to prevent an excessive rise of the rotating speed of the first planetary gear P1.

While the preferred embodiments of this invention have been described in detail by reference to the accompanying drawings, it is to be understood that the present invention may be otherwise embodied.

In the illustrated embodiments, the engine speed limiting means 86 implements the engine speed limiting control when the automatic transmission portion is shifted to any failure gear position is established. However, the engine speed limiting control may be implemented in any cases other than the case of the shifting action to the failure gear position. For instance, the engine speed $N_E$ may be limited to within a range not lower than the lower limit determined on the basis of the actual vehicle speed V and according to the lower engine speed limit maps of FIG. 13, to prevent an excessive rise of the first planetary gear speed $N_{P1}$ into the excessive rise range. Although this modification is not necessarily desirable from the standpoint of fuel economy of the vehicle since the engine 8 cannot be stopped, it is possible to start the control for preventing the excessive rise of the first planetary gear speed $N_{P1}$ into the excessive rise range, without making the determination as to whether the automatic transmission portion is shifted to the failure gear position.

The illustrated embodiment, the engine speed limiting means 86 is configured to limit the range of the engine speed $N_E$ for preventing an excessive rise of the operating speed of the first electric motor M1, to improve the durability of the first electric motor M1. This limitation of the range of the engine speed $N_E$ makes it possible to prevent the second electric motor speed $N_{M1}$ from being held at a high value. In this sense, it can be said that the limitation of the engine speed $N_E$ contributes to an improvement of the durability of the second electric motor M2.

In the illustrated drive system, the differential portion 11 (power distributing mechanism 16) functions as the electrically controlled continuously-variable transmission the speed ratio γ0 of which is continuously variable from the minimum value γ0min to the maximum value γ0max. However, the principle of the present invention is applicable to a drive system wherein the speed ratio γ0 of the differential portion 11 is variable not continuously, but in steps, by utilizing the differential function.

In the illustrated drive system, the differential portion 11 may be provided with a differential limiting device incorporated in the power distributing mechanism 16 to enable the differential portion 11 to operate as a step-variable transmission having at least two forward-drive gear positions.

In the power distributing mechanism 16 of the illustrated drive system, the first carrier CA1 is fixed to the engine 8, and the first sun gear S1 is fixed to the first electric motor M1 while the first ring gear R1 is fixed to the power distributing member 18. However, this arrangement is not essential. The engine 8, first electric motor M1 and power transmitting member 18 may be fixed to any other elements selected from the three elements CA1, S1 and R1 of the first planetary gear set 24.

While the engine 8 is directly fixed to the input shaft 14 in the illustrated embodiments, the engine 8 may be operatively connected to the input shaft 14 through any suitable member such as gears and a belt, and need not be disposed coaxially with the input shaft 14.

In the illustrated drive system, the first and second electric motors M1, M2 are disposed coaxially with the input shaft 14, and are respectively connected to the first sun gear S1 and the power transmitting member 18. However, this arrangement is not essential. For instance, the first and second electric motors M1, M2 may be respectively operatively connected to the first sun gear S1 and the power transmitting member 18 through belts or speed reduction devices.

The hydraulically operated frictional coupling devices such as the first and second clutches C1, C2 used in the illustrated drive system may be replaced by magnetic-power type, electromagnetic type or mechanical type coupling devices such as power clutches, electromagnetic clutches and meshing type dog clutches. Where the electromagnetic clutches are used, the hydraulic control unit 70 incorporating valve devices is replaced by an electric switching device or an electromagnetic switching device operable to control command signals to be applied to the electromagnetic clutches.

In the illustrated drive system, the automatic transmission portion 20 is disposed in the power transmitting path between the drive wheels 38, and the power transmitting member 18 which is the output member of the differential portion 11 or power distributing mechanism 16. However, the automatic transmission portion 20 may be replaced by any other type of power transmitting device such as: a continuously variable transmission (CVT) which is a kind of an automatic transmission; an automatic transmission which is a permanent-mesh parallel-two-axes type transmission well known as a manual transmission and which is automatically shifted by select cylinders and shift cylinders; and a manual transmission of synchronous meshing type which is manually operated to select the desired gear position.

In the illustrated drive system, the automatic transmission portion 20 is connected in series to the differential portion through the power transmitting member 18. However, the automatic transmission portion 20 may be disposed coaxially with a counter shaft disposed parallel to the input shaft 14. In this case, the differential portion 11 and the automatic transmission portion 20 are connected to each other through a suitable power transmitting member or members in the form of a pair of counter gears, or sprockets and a chain, such that a rotary motion can be transmitted between the differential portion 11 and the automatic transmission portion 20.

The power distributing mechanism 16 provided as the differential mechanism may be replaced by a differential gear device including a pinion rotated by the engine 8, and a pair of bevel gears which meshes with the pinion and which is operatively connected to the first electric motor M2 and the power transmitting member 18 (second electric motor M2).

While the power distributing mechanism 16 in the illustrated power transmitting system 10 is constituted by one planetary gear set 24, it may be constituted by two or more planetary gear sets so that the power distributing mechanism 16 is operable as a transmission having three or more gear positions in the non-differential state (fixed-speed-ratio shifting state). The planetary gear sets are not limited to the single-pinion type, and may be of a double-pinion type.

The shifting device 50 in the illustrated drive system is provided with the shift lever 52 for selecting the plurality of shift positions $P_{SH}$. However, the shift lever 52 may be replaced by a pushbutton switch, a slide type switch or any other switch for selecting a plurality of shift positions, a device operable to select a plurality of shift positions $P_{SH}$ in response to a voice of the vehicle operator rather than a manual operation of the vehicle operator, or a device operable to select a plurality of shift positions in response to a foot operation of the vehicle operator. When the shift lever 52 is placed in the position M, the number of the selectable gear positions can be selected. However, the highest gear position selectable can be selected by the shift lever 92 placed in the position M. In this case, the automatic transmission portion 20 is shifted when the highest gear position selectable is changed. When the shift lever 52 is manually operated from the position M to a shift-up position "+" or a shift-down position "−", the automatic transmission portion 20 is shiftable to any one of the first through fourth gear positions.

It is to be understood that the embodiments of the invention have been descried for illustrative purpose only, and that the present invention may be embodied with various changes and modifications which may occur to those skilled in the art.

The invention claimed is:

1. A control apparatus for a drive system of a vehicle including a differential portion having a differential mechanism having a first element connected to an-engine, a second element connected to a first electric motor and a third element connected to a power transmitting member and configured to distribute an output of said engine to said first electric motor and said power transmitting member, and a transmission portion disposed in a power transmitting path between said power transmitting member and a drive wheel, said control apparatus comprising:
engine speed limiting means for limiting a range of an operating speed of said engine according to a speed ratio of said transmission portion; and
said engine speed limiting means limiting the range of the operating speed of said engine in a range of a low vehicle speed, and further limiting the range of the operating speed of said engine in a range of a high vehicle speed in addition to the range of the low vehicle speed, the range of the high vehicle speed being set up to a higher value of the vehicle speed as the speed ratio of said transmission portion becomes higher.

2. The control apparatus according to claim 1, wherein said engine speed limiting means limits the range of the operating speed of said engine for an upper limit of the operating speed of said engine.

3. The control apparatus according to claim 1, wherein said engine speed limiting means limits the range of the operating speed of said engine for a lower limit of the operating speed of said engine.

4. The control apparatus according to claim 1, wherein said engine speed limiting means limits the range of the operating speed of said engine by limiting a load of the engine.

5. The control apparatus according to claim 1, wherein said engine speed limiting means limits the range of the operating speed of said engine on the basis of a running speed of the vehicle.

6. The control apparatus according to claim 1, wherein said transmission portion is constituted by an automatic transmission configured to be shifted according to a predetermined shifting map,
and wherein said engine speed limiting means limits the range of the operating speed of said engine in accordance with a gear ratio of said automatic transmission established when said automatic transmission is shifted as a result of a failure to perform shifting actions according to said shifting map.

7. The control apparatus according to claim 1, wherein said differential portion is operable as a continuously-variable transmission by controlling an operating state of said first electric motor.

8. The control apparatus according to claim 1, wherein said engine speed limiting means limits the range of the operating speed of said engine when a required amount of an output by a driver rises up to a predetermined value, the predetermined value becoming higher as the vehicle speed becomes lower, during the vehicle speed being low where the range of the operating speed of said engine is limited.

* * * * *